(12) United States Patent
Kim et al.

(10) Patent No.: US 11,200,398 B2
(45) Date of Patent: Dec. 14, 2021

(54) DISPLAY DEVICE AND METHOD OF DRIVING DISPLAY DEVICE

(71) Applicant: Samsung Display Co., Ltd., Yongin-Si (KR)

(72) Inventors: Il Nam Kim, Yongin-si (KR); Jae Kyoung Kim, Yongin-si (KR); Ji Hun Ryu, Yongin-si (KR); Eun Jin Sung, Yongin-si (KR); Seong Ryong Lee, Yongin-si (KR); Jong Hyun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/999,314

(22) Filed: Aug. 21, 2020

(65) Prior Publication Data

US 2021/0056282 A1     Feb. 25, 2021

(30) Foreign Application Priority Data

Aug. 22, 2019    (KR) ................. 10-2019-0103045

(51) Int. Cl.
    *G02F 1/136*        (2006.01)
    *G06K 9/00*         (2006.01)
    *G09G 3/32*         (2016.01)

(52) U.S. Cl.
    CPC ........... *G06K 9/0004* (2013.01); *G02F 1/136* (2013.01); *G09G 3/32* (2013.01); *G09G 2310/08* (2013.01); *G09G 2330/021* (2013.01)

(58) Field of Classification Search
    CPC .... G06K 9/0004; G09G 3/32; G09G 2310/08; G09G 2330/021; G02F 1/136227; G03B 21/006
    USPC .............................................. 349/43; 353/38
    See application file for complete search history.

(56) References Cited

U.S. PATENT DOCUMENTS

| | | | |
|---|---|---|---|
| 2002/0021378 A1* | 2/2002 | Murade | ............. G02F 1/136227 349/43 |
| 2010/0220299 A1* | 9/2010 | Mizushima | .......... G03B 21/006 353/38 |
| 2020/0219948 A1 | 7/2020 | Kim et al. | |
| 2020/0312230 A1 | 10/2020 | Bae | |
| 2020/0343312 A1 | 10/2020 | Ryu et al. | |

FOREIGN PATENT DOCUMENTS

| | | |
|---|---|---|
| KR | 10-2020-0085403 | 7/2020 |
| KR | 10-2020-0115767 | 10/2020 |
| KR | 10-2020-0124800 | 11/2020 |

* cited by examiner

*Primary Examiner* — Abdul-Samad A Adediran
(74) *Attorney, Agent, or Firm* — H.C. Park & Associates, PLC

(57) ABSTRACT

A display device including a display panel having a display area including a plurality of pixels and a non-display area surrounding at least one side of the display area, a light blocking layer at least partially overlapping the display area and including opening portions for selectively passing incident light, and a power supply device configured to supply power to the pixels and the light blocking layer, in which the power supply device is configured to apply control power having a different voltage value in correspondence with a type of an image to be displayed in the display area to the light blocking layer, during a display period.

20 Claims, 19 Drawing Sheets

DISPLAY DEVICE AND METHOD OF DRIVING DISPLAY DEVICE

CROSS-REFERNCE TO RELATED APPLICATION

This application claims priority from and the benefit of Korean Patent Application No. 10-2019-0103045, filed on Aug. 22, 2019, which is hereby incorporated by reference for all purposes as if fully set forth herein.

BACKGROUND

Field

Exemplary embodiments of the invention relate generally to a display device, and more specifically, to a method of driving the display device.

Discussion of the Background

In recent years, a biometric information authentication method using a fingerprint of a user of a display device, such as a smartphone or a tablet PC, has been widely used. In order to provide a fingerprint sensing function, a fingerprint sensor may be provided by being embedded or attached to a display device.

For example, the fingerprint sensor may be configured as a sensor of a light sensing method. The fingerprint sensor of the light sensing method may include a light source, a lens, and a light sensor array. When a fingerprint sensor is attached to a display panel, however, a thickness of the display device and a manufacturing costs may be increased.

The above information disclosed in this Background section is only for understanding of the background of the inventive concepts, and, therefore, it may contain information that does not constitute prior art.

SUMMARY

Fingerprint sensor integrated display devices constructed according to exemplary embodiments of the invention and a driving method of the same utilizes organic light emitting diodes in pixels as a light source, and a light blocking layer that selectively transmits reflected light among light emitted from the light source.

Exemplary embodiments also provide display devices and a method of driving the same that are capable of inducing a characteristic change for transistors in the pixels by applying power to a light blocking layer to transfer an electric field effect to adjacent pixels.

Additional features of the inventive concepts will be set forth in the description which follows, and in part will be apparent from the description, or may be learned by practice of the inventive concepts.

A display device according to an exemplary embodiment includes a display panel having a display area including a plurality of pixels and a non-display area surrounding at least one side of the display area, a light blocking layer at least partially overlapping the display area and including opening portions for selectively passing incident light, and a power supply device configured to supply power to the pixels and the light blocking layer, in which the power supply device is configured to apply control power having a different voltage value in correspondence with a type of an image to be displayed in the display area to the light blocking layer, during a display period.

The power supply device may be configured to apply first control power to the light blocking layer if the image to be displayed in the display area is a still image, and second control power having a voltage value less than a voltage value of the first control power to the light blocking layer if the image to be displayed in the display area is a dynamic image.

The first control power may have a positive voltage value, and the second control power may have a negative voltage value.

The power supply device may be configured to apply third control power having a voltage value less than the voltage value of the first control power to the light blocking layer during a fingerprint sensing period, the third control power having the same voltage value as the second control power or a voltage value different from the voltage value of the second control power.

The power supply device may include a power converter configured to generate a plurality of powers having different voltage values, and a multiplexer configured to apply any one of the plurality of powers to the light blocking layer as the control power.

The display device may further include a timing controller configured to supply a multiplexer control signal corresponding to the type of the image to be displayed in the display area to the multiplexer.

The plurality of powers may include high potential panel driving power and low potential panel driving power for driving the pixels, and the multiplexer may be configured to apply any one of the high potential panel driving power and the low potential panel driving power to the light blocking layer as the control power based on the multiplexer control signal.

The power supply device may further include a controller configured to provide a control signal for controlling voltage values of the plurality of powers to the power converter.

The multiplexer may be disposed in the non-display area of the display panel, and the power converter may be disposed on a printed circuit board electrically connected to the display panel.

The display panel may include a first power line to transfer high potential panel driving power generated by the power converter to the pixels, a second power line to transfer low potential panel driving power generated by the power converter to the pixels, and a third power line to transmit the control power output from the multiplexer to the light blocking layer.

The multiplexer may be electrically connected to the power converter to receive the plurality of power lines from the power converter.

The plurality of powers may include the high potential panel driving power and the low potential panel driving power, and the multiplexer may be electrically connected to the first power line and the second power line to receive the high potential panel driving power and the low potential panel driving power.

The display panel may include a substrate, a circuit element layer, on which a plurality of circuit elements for driving the plurality of pixels are disposed, and a light emitting element layer disposed on the circuit element layer and including light emitting elements, and the light blocking layer is disposed between the substrate and the circuit element layer.

If the control power is applied to the light blocking layer, an element characteristic of the plurality of circuit elements may be configured to be changed by an electric field effect of the light blocking layer.

The display device may further include a plurality of light sensors configured to sense light incident through the opening portions and to output a corresponding sensing signal, and a fingerprint detector configured to detect a fingerprint of a user based on the sensing signal.

A method of driving a display panel having a display area including a plurality of pixels and a non-display area surrounding at least one side of the display area, and a light blocking layer at least partially overlapping the display area and including opening portions for selectively passing incident light, the method according to another exemplary embodiment includes generating a plurality of powers having different voltage values, determining a type of an image to be displayed in the display area during a display period, and applying any one of the plurality of powers to the light blocking layer in correspondence with the determined type of the image.

Applying any one of the plurality of powers to the light blocking layer may include applying one of the plurality of powers to the light blocking layer as first control power if the image to be displayed in the display area is a still image, and applying another one of the plurality of powers to the light blocking layer as second control power having a voltage value less than that of the first control power if the image to be displayed in the display area is a dynamic image.

The method may further include applying third control power having a voltage value less than the voltage value of the first control power to the light blocking layer during a fingerprint sensing period, in which the third control power has the same voltage value as the second control power or a voltage value different from the voltage value of the second control power.

Generating the plurality of powers may include generating high potential panel driving power and low potential panel driving power for driving the pixels, and applying any one of the plurality of powers to the light blocking layer comprises applying any one of the high potential panel driving power and the low potential panel driving power to the light blocking layer.

The method may further include detecting a fingerprint of a user based on light incident through the opening portions during the fingerprint sensing period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
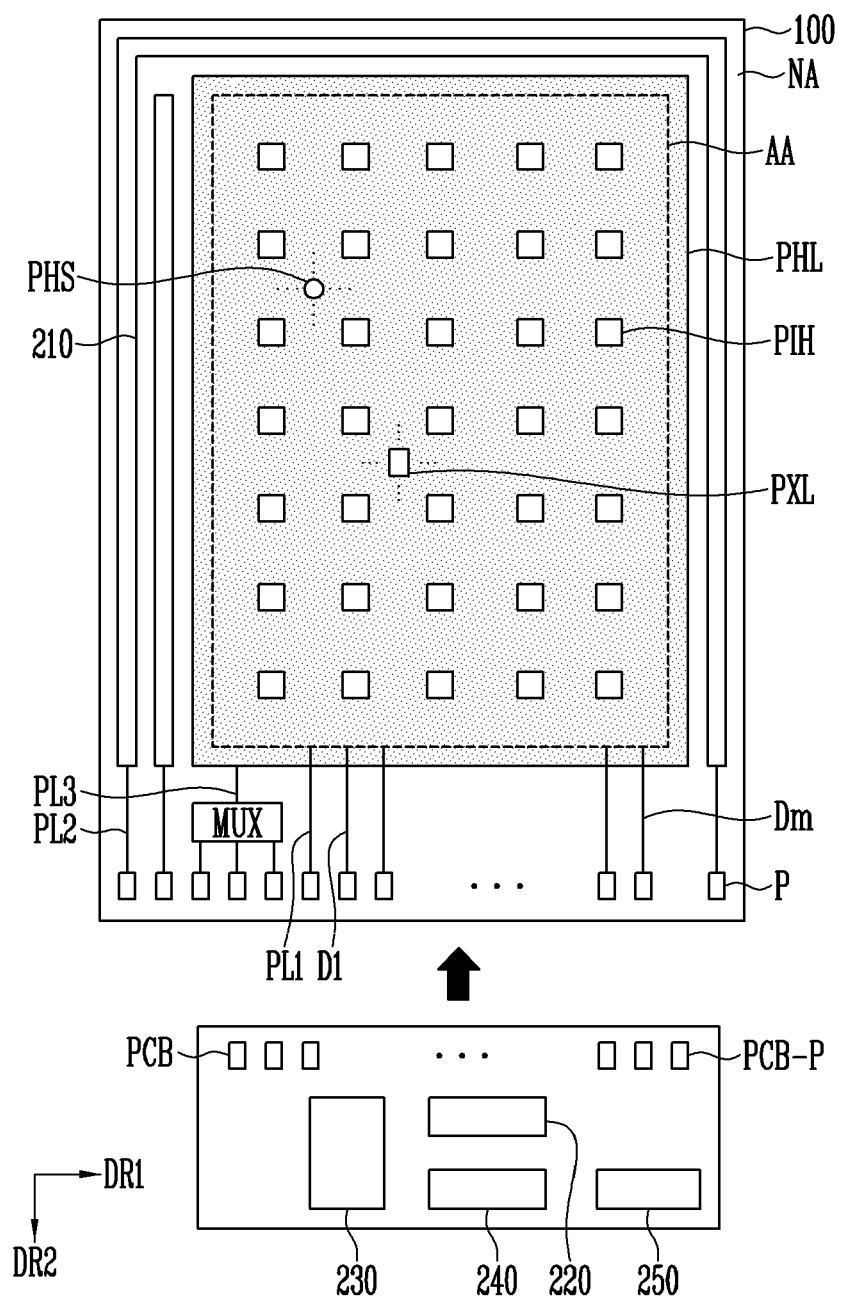
FIGS. 1A and 1B are schematic plan views of a display device according to exemplary embodiments.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
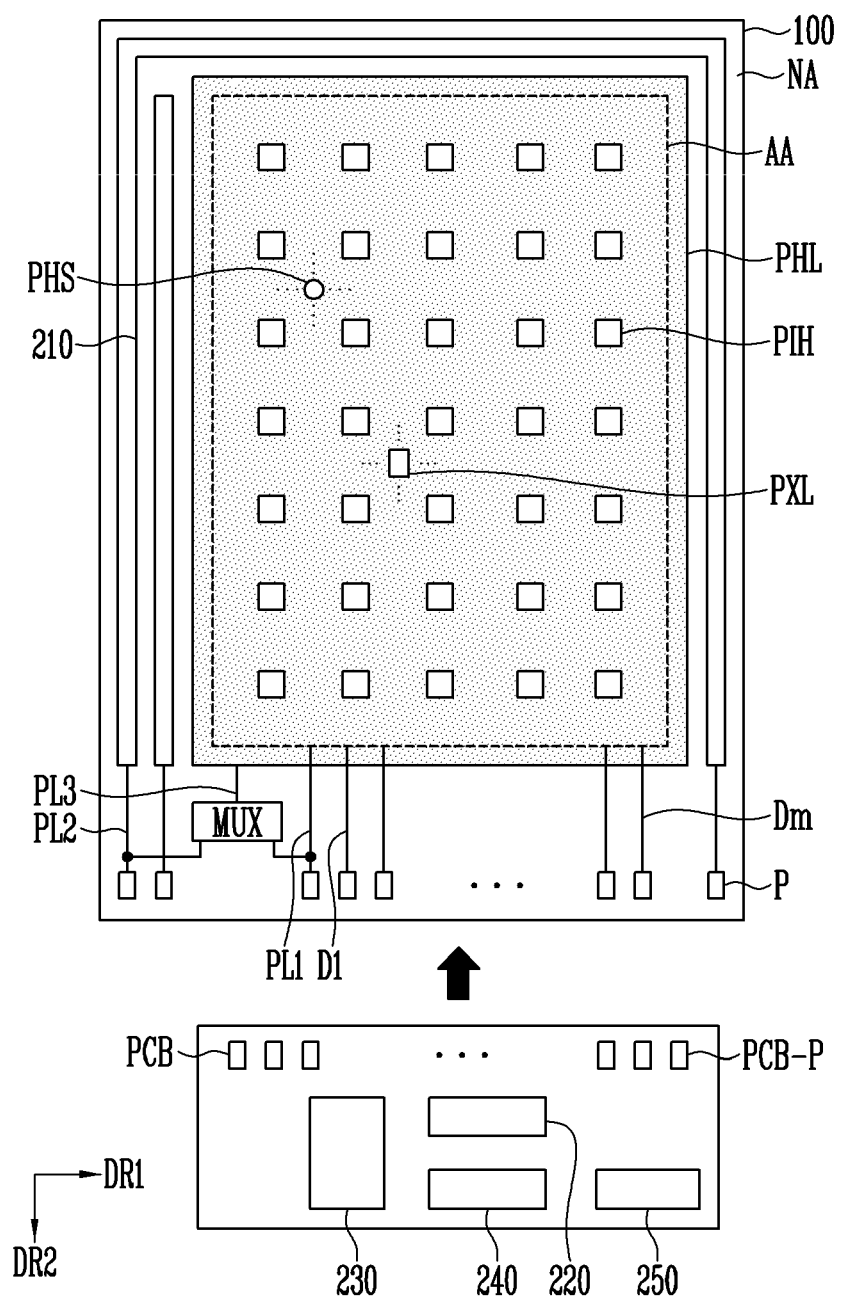

FIGS. 1A and 1B are schematic plan views of a display device according to exemplary embodiments.

The display device may be provided in various shapes. For example, the display device may be provided in substantially a rectangular plate shape having two pairs of sides parallel to each other. The display device may display arbitrary visual information, for example, a text, a video, a photograph, a two-dimensional or three-dimensional image, and the like, in an image display direction.

The entire or at least a portion of the display device may be flexible. For example, the display device may have flexibility in the entire area, or at least in some areas thereof.

Referring to FIGS. 1A and 1B, the display device may include a display panel 100 and a printed circuit board PCB electrically connected to the display panel 100.

The display panel 100 includes a display area AA and a non-display area NA. The display area AA is an area where a plurality of pixels PXL (which may be referred to as sub-pixels) are provided, and may be referred to as an active area. In some exemplary embodiments, each of the pixels PXL may include at least one light emitting element. The light emitting element may be an organic light emitting diode or an ultra-small inorganic light emitting diode having a size of a micro to nano scale range, but the inventive concepts are not limited thereto. The display panel 100 displays an image on the display area AA by driving the pixels PXL in accordance with externally input image data.

According to an exemplary embodiment, the display panel 100 may further include a plurality of light sensors PHS provided in the display area AA. The light sensors PHS may be disposed on a rear surface (for example, a back surface) opposite to a surface (for example, a front surface), on which an image is displayed, of the display panel 100. However, the inventive concepts are not limited thereto.

The light sensors PHS may sense that light emitted from a light source is reflected by a finger of a user, and analyze the reflected light to sense the fingerprint of the user. Hereinafter, the light sensors PHS will be described as being used for a fingerprint sensing purpose, however, in some exemplary embodiments, the light sensors PHS may be used for the purpose of performing various functions, such as a touch sensor or a scanner.

The light sensors PHS may be disposed in the display area AA. In this case, the light sensors PHS may overlap at least a part or each of the pixels PXL provided in the display area AA, or may be disposed around the pixels PXL. For example, at least some or each of the light sensors PHS may be provided between the pixels PXL.

When the light sensors PHS are provided adjacent to the pixels PXL, the light sensors PHS may use the light emitting element provided in at least one pixel PXL disposed in the display area AA as the light source. In this case, the light sensors PHS may form a fingerprint sensor of a light sensing method together with the pixels PXL of the display area AA, more particularly, with the light emitting elements provided in the pixels PXL. As described above, when a fingerprint sensor embedded type display device utilizes the pixels PXL as the light source without a separate external light source, a module thickness of the display device including the fingerprint sensor of the light sensing method may be reduced, as well as associated manufacturing costs.

The display panel 100 may include a light blocking layer PHL. The light blocking layer PHL may include a plurality of pinholes PIH. The pinholes PIH may refer to an optical hole, which may transmit light therethrough.

The light blocking layer PHL may be disposed between the light sensors PHS and the pixels PXL, to block a portion of light incident to the light sensors PHS. For example, the light blocking layer PHL may selectively block and pass light reflected from an object (hereinafter, referred to as reflected light), which is in contact with an upper end of the display panel 100, for example, a finger. A fraction of light incident to the light blocking layer PHL may be blocked, and the remaining light may pass through the pinholes PIH and reach the light sensors PHS below the light blocking layer PHL.

According to an exemplary embodiment, the light blocking layer PHL may be disposed in correspondence with the display area AA. For example, the light blocking layer PHL may have a size greater than that of the display area AA as shown in FIGS. 1A and 1B, and thus, a portion of the light blocking layer PHL may overlap the non-display area NA. However, the inventive concepts are not limited thereto, and in some exemplary embodiments, the light blocking layer PHL may have a size the same as or less than that of the display area AA.

The non-display area NA is an area disposed around the display area AA, and may be referred to as a non-active area. In some exemplary embodiments, the non-display area NA may refer to the remaining area of the display panel 100 except for the display area AA.

A scan driver 210 that applies a scan signal to the pixels PXL through a scan line may be disposed on one side of the non-display area NA. In FIGS. 1A and 1B, the scan driver 210 is illustrated as being disposed on the non-display area NA of the display panel 100, however, the inventive concepts are not limited thereto. For example, in some exemplary embodiments, the scan driver 210 may be provided on the printed circuit board PCB, which will be described in more detail later.

A plurality of pads P may be disposed in the non-display area NA. The pads P may be exposed without being covered by an insulating layer, and may be electrically connected to the printed circuit board PCB to be described later.

The pads P may be connected to the pixels PXL, the scan driver 210, and the light blocking layer PHL through corresponding lines. The lines may supply an electrical signal to the pixels PXL, and the scan driver 210, and the light blocking layer PHL.

For example, the lines may supply data signals to the pixels PXL and may include a plurality of data lines D1 to Dm extending in a second direction DR2. In addition, the lines may include a control signal line for supplying a scan driving control signal to the scan driver 210.

In addition, the lines may include a first power line PL1 for applying first panel driving power (for example, high potential panel driving power) to the pixels PXL and a second power line PL2 for applying second panel driving power (for example, low potential panel driving power) to the pixels PXL. According to an exemplary embodiment, the second power line PL2 may be disposed to surround three side surfaces of the display area AA.

In addition, the lines may include a third power line PL3 for applying control power to the light blocking layer PHL. According to an exemplary embodiment, the third power line PL3 may be connected to a multiplexer MUX.

The lines are not limited to those described above, and in some exemplary embodiments, the lines may further include additional control signal lines, additional power lines, and dummy control lines connected to dummy pads configuring some of the pads P.

As shown in FIG. 1A, the multiplexer MUX may output any one of a plurality of powers directly supplied from a power supply 230 through the pads P and circuit board pads PCB-P to the third power line PL3. Alternatively, as shown in FIG. 1B, the multiplexer MUX may be electrically connected to the first power line PL1 and the second power line PL2 to output any one of power applied to the first power line PL1 and the second power line PL2, to the third power line PL3.

The printed circuit board PCB may be a rigid circuit board or a flexible circuit board. The printed circuit board PCB may be directly coupled to the display panel 100, or may be connected to the display panel 100 through another circuit board.

The printed circuit board PCB may include the circuit board pads PCB-P electrically connected to the display panel 100. In some exemplary embodiments, the printed circuit board PCB may further include lines connecting the circuit board pads PCB-P, and a data driver 220, the power supply 230, a timing controller 240, and a fingerprint detector 250 to each other.

The data driver 220 connected to the pixels PXL through the data lines D1 to Dm to apply a data signal may be disposed on the printed circuit board PCB. In FIGS. 1A and 1B, the data driver 220 is illustrated as being disposed on the printed circuit board PCB, however, the inventive concepts are not limited thereto. For example, in some exemplary embodiments, the data driver 220 may be provided in the non-display area NA or the like of the display panel 100.

The power supply 230 for applying power to other components may be disposed on the printed circuit board PCB. The power supply 230 may be connected to the data driver 220 on the printed circuit board PCB to apply necessary power to the data driver 220. In addition, the power supply 230 may be connected to the scan driver 210, the first power line PL1, the second power line PL2, and the multiplexer MUX through the circuit board pads PCB-P and the pads P to supply power to the scan driver 210, the pixel PXL, and the light blocking layer PHL.

The timing controller 240 that controls an operation of the display panel 100 may be disposed on the printed circuit board PCB. The timing controller 240 may drive the scan driver 210 and the data driver 220 to sequentially scan the pixels PXL of the display area AA, and supply the data signal corresponding to the image data to the pixels PXL during a display period in one frame. Then, the display panel 100 may display an image corresponding to the image data. In addition, the timing controller 240 may drive the power supply 230 to supply necessary power (for example, driver driving power, control power, and/or panel driving power) to the scan driver 210, the data driver 220, the light blocking layer PHL, and the pixels PXL.

According to an exemplary embodiment, the timing controller 240 may supply a driving signal for fingerprint sensing to the pixels PXL during a fingerprint sensing period in one frame. The fingerprint sensing period may be provided in each frame or in frames at a predetermined interval. Alternatively, the fingerprint sensing period may be provided in part or each of the frame while a touch input is sensed on the display panel 100.

The driving signal provided to the pixels PXL during the fingerprint sensing period may cause the pixels PXL to emit light and operate as the light source for the light sensor PHS. In this case, the driving signal for the fingerprint sensing may be provided to the pixels PXL disposed in a specific area within the display panel 100, for example, the pixels PXL disposed in the display area AA. According to an exemplary embodiment, the driving signal for the fingerprint sensing may be provided by the fingerprint detector 250.

The fingerprint detector 250 may transfer the driving signal for driving the light sensors PHS to the light sensors PHS, and may detect the user fingerprint based on a sensing signal received from the light sensors PHS.

Each of the data driver 220, the power supply 230, the timing controller 240, and the fingerprint detector 250 may be mounted on the printed circuit board PCB as an integrated chip. Alternatively, at least two of the data driver 220, the power supply 230, the timing controller 240, and the fingerprint detector 250 may be mounted on the printed circuit board PCB as one integrated chip.

In FIGS. 1A and 1B, the pinholes PIH and the light sensors PHS are illustrated as being disposed in the display area AA, however, the inventive concepts are not limited thereto. For example, in some exemplary embodiments, at least a portion of the display area AA may be set as a sensing area, and the pinholes PIH and the light sensors PHS may be disposed in the sensing area. In this case, a size of the light blocking layer PHL may correspond to or be greater than a size of the sensing area. When the size of the light blocking layer PHL is greater than the size of the sensing area, the light blocking layer PHL may have a size equal to or less than that of the display area AA. Alternatively, as shown in FIGS. 1A and 1B, the light blocking layer PHL may have a size greater than that of the display area AA.

In addition, in FIG. 1A and FIG. 1B, the multiplexer MUX and the power supply 230 are illustrated as being a separate element, however, in some exemplary embodiments, the multiplexer MUX and the power supply 230 may be configured as one power supply for supplying control power to the light blocking layer PHL, and may be applied to the exemplary embodiments.

Figure 2:
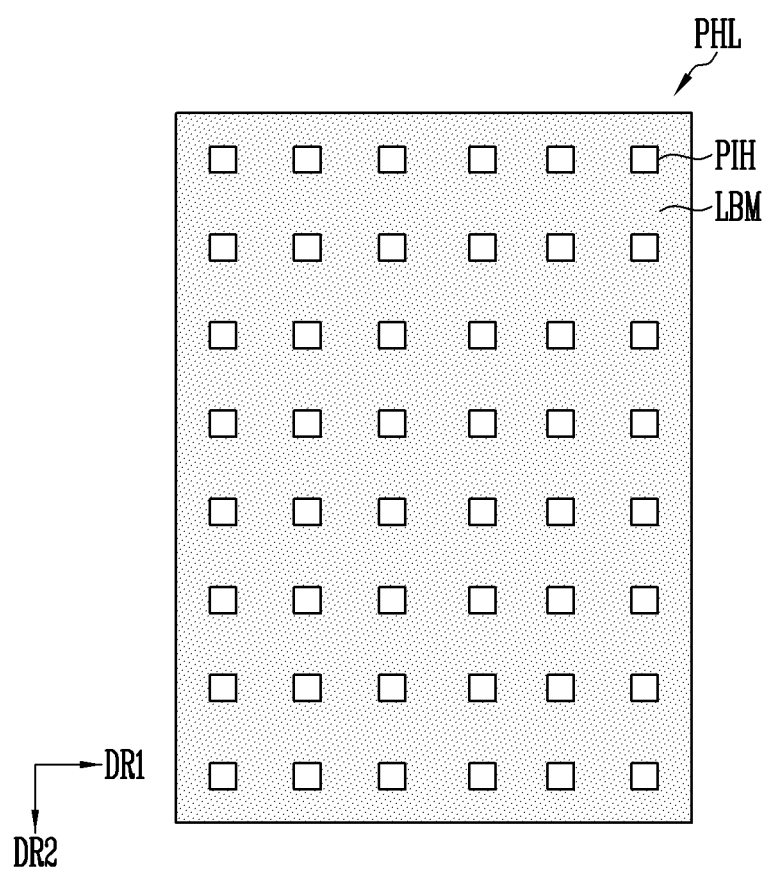
FIG. 2 is a plan view of a light blocking layer according to an exemplary embodiment.

FIG. 2 is a plan view of a light blocking layer according to an exemplary embodiment. FIG. 2 exemplarily illustrates the light blocking layer PHL shown in FIGS. 1A and 1B.

Referring to FIG. 2, the light blocking layer PHL according to an exemplary embodiment may include a light blocking mask LBM and a plurality of pinholes PIH distributed in the light blocking mask LBM.

The light blocking mask LBM may include a light blocking and/or a light absorbing material. For example, the light blocking mask LBM may include an opaque metal layer that is locally opened in an area where each pinhole PIH is disposed. However, the inventive concepts are not limited thereto, and the light blocking mask LBM may include various other materials capable of blocking light transmission. For example, the light blocking mask LBM may include a black matrix material.

The pinholes PIH may be opening portions dispersed in the light blocking mask LBM. In particular, the pinholes PIH may be empty spaces, in which at least one area of the light blocking mask LBM is removed and opened, and may be through holes penetrating the light blocking mask LBM. Alternatively, the pinholes PIHs may be optical holes that are transparent or translucent, so as to selectively transmit only a portion of incident light, and may be light transmitting holes.

The pinholes PIH may be dispersed in the light blocking mask LBM in a regular or irregular pattern, so as to have a predetermined size and pitch. The pinholes PIH may be formed at an appropriate size and pitch to sense a sharper fingerprint shape while preventing diffraction of the incident light. For example, a width of the pinholes PIH may be set to about 10 times or more with respect to a wavelength of the incident light to prevent diffraction of the light. In addition, the distance between the pinholes PIH may be determined by a distance between the light blocking layer PHL and the light sensors PHS, the wavelength of the incident light, and a required observation view (field of view ("FOV")) with respect to the pinholes PIH.

In FIG. 2, the pinholes PIH are shown as rectangles, however, the inventive concepts are not limited thereto. For example, in some exemplary embodiments, the pinholes PIH may have various shapes, such as rectangles, circles, ellipses, and polygons. In addition, the size, shape, number, resolution, arrangement structure, and/or the like of the pinholes PIH may be variously changed in other exemplary embodiments.

The light blocking layer PHL may configure an optical system for selectively transmitting only a portion of light and blocking the remaining light. The light blocking layer PHL may configure a fingerprint sensor together with the light sensors PHS described above. In addition, the light blocking layer PHL may be integrally formed with the circuit element layer of the display panel 100. In this case, a thickness of a module of the display device including the fingerprint sensor of the light sensing method may be reduced or minimized.

Figure 3:
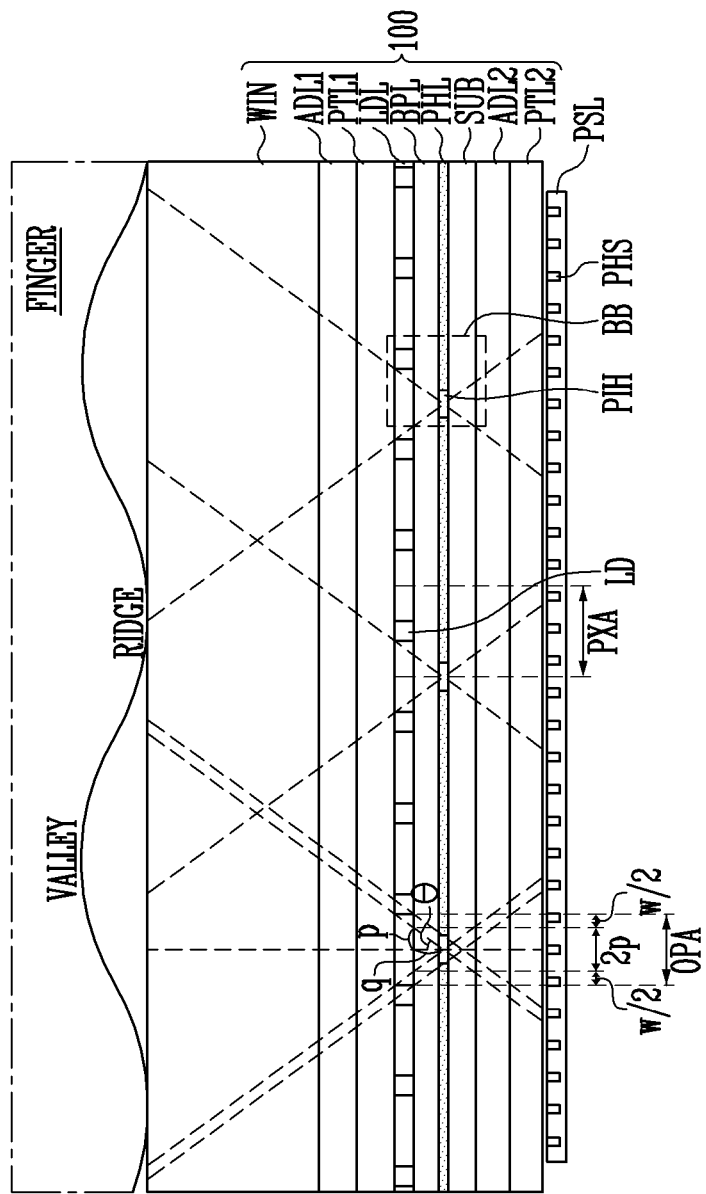
FIG. 3 is a cross-sectional view of a display device according to an exemplary embodiment.

FIG. 3 is a cross-sectional view of a display device according to an exemplary embodiment.

Referring to FIG. 3, the display device according to an exemplary embodiment may include the display panel 100 and a sensor layer PSL disposed on one surface of the display panel 100.

The display panel 100 may display an image, and a type of the display panel 100 not particularly limited. The display panel 100 may be a display panel capable of self-emission, such as an organic light emitting display panel (OLED panel). In addition, the display panel 100 may be a non-light emitting display panel, such as a liquid crystal display panel (LCD panel), an electro-phoretic display panel (EPD panel), and an electro-wetting display panel (EWD panel). When the display panel 100 is configured as the non-light emitting display panel, the display device may include a backlight unit that supplies light to the display panel 100.

The display panel 100 may include a substrate SUB, and a circuit element layer BPL, a light emitting element layer LDL, a first protective layer PTL1, a first adhesive layer ADL1, and a window WIN, which are sequentially disposed on one surface (for example, an upper surface) of the substrate SUB. In addition, the display device may include a second adhesive layer ADL2 and a second protective layer PTL2, which are sequentially disposed on another surface (for example, a lower surface) of the substrate SUB.

The substrate SUB may be a substantially transparent transmissive substrate, which may function as a base substrate of the display panel 100. The substrate SUB may be a rigid substrate including glass or tempered glass, or a flexible substrate of a plastic material. However, the inventive concepts are not limited to a particular material of the substrate SUB, and in some exemplary embodiments, the substrate SUB may include various materials.

The substrate SUB may include the display area AA and the non-display area NA as shown in FIGS. 1A and 1B. In addition, the display area AA may include a plurality of pixel areas PXA, in which each pixel PXL is disposed and/or formed.

The circuit element layer BPL may be disposed on one surface of the substrate SUB, and include at least one conductive layer. For example, the circuit element layer BPL may include a plurality of circuit elements configuring a pixel circuit of the pixels PXL, and lines for supplying various power and signals for driving the pixels PXL. In this case, the circuit element layer BPL may include various circuit elements, such as at least one transistor and a capacitor, and a plurality of conductive layers forming the lines connected thereto. In addition, the circuit element layer BPL may include at least one insulating layer provided between the plurality of conductive layers. The circuit element layer BPL may include a line portion disposed in the non-display area NA of the substrate SUB, which may supply the power and signals corresponding to the lines connected to the pixels PXL.

The light emitting element layer LDL may be disposed on one surface of the circuit element layer BPL. The light emitting element layer LDL may include a plurality of light emitting elements LD connected to the circuit elements and/or the lines of the circuit element layer BPL through a contact hole or the like. The light emitting elements LD may be organic light emitting diodes or micro light emitting elements having a structure, in which an inorganic crystal structure is grown. According to an embodiment, at least one of the plurality of light emitting elements LD may be disposed in each pixel area PXA.

Each of the pixels PXL may include the circuit elements disposed in the circuit element layer BPL, and at least one light emitting element LD disposed in the light emitting element layer LDL above the circuit element layer BPL. The structure of the pixel PXL will be described in more detail later.

The first protective layer PTL1 may be disposed above the light emitting element layer LDL to cover the display area AA. The first protective layer PTL1 may include a sealing member, such as a thin film encapsulation ("TFE") or a sealing substrate, and may further include a protective film or the like in addition to the sealing member.

The first adhesive layer ADL1 is disposed between the first protective layer PTL1 and the window WIN to couple the first protective layer PTL1 and the window WIN. The first adhesive layer ADL1 may include a transparent adhesive, such as an optical clear adhesive ("OCA"), and may include various adhesive materials.

The window WIN may be a protective member disposed at the uppermost end of the module of the display device including the display panel 100, and may be a substantially transparent transmissive substrate. The window WIN may have a multilayer structure selected from a glass substrate, a plastic film, and a plastic substrate. The window WIN may include a rigid or flexible substrate, and a material forming the window WIN is not particularly limited.

In some exemplary embodiments, the display device may further include a polarization plate, a touch sensor layer (touch electrode layer), and/or the like. For example, the display device may further include a polarization plate and/or a touch sensor layer disposed between the first protective layer PTL1 and the window WIN.

The second protective layer PTL2 may be disposed on the other surface of the substrate SUB. The second protective layer PTL2 may be coupled to the substrate SUB by the second adhesive layer ADL2.

The second adhesive layer ADL2 may firmly bond (or attach) the substrate SUB and the second protective layer PTL2. The second adhesive layer ADL2 may include a transparent adhesive, such as an OCA. The second adhesive layer ADL2 may include a pressure sensitive adhesive ("PSA"), in which an adhesive material activates when a pressure for adhesion is applied to an adhesive surface. If the second adhesive layer ADL2 includes a PSA, the second adhesive layer ADL2 may be adhered to the adhesive surface only by pressure without an additional heat process or UV process at room temperature.

According to an exemplary embodiment, the second adhesive layer ADL2 may include a material that absorbs specific light or blocks the specific light. For example, the second adhesive layer ADL2 may include an infrared light absorbing material that absorbs infrared light having a high energy density, or may include an infrared light blocking material that blocks the infrared light.

The infrared light absorbing material may include, for example, an inorganic based oxide including antimony-tin oxide ("ATO"), indium tin oxide ("ITO"), tungsten oxide, carbon black, and the like, and metal, such as Ag. In case of the inorganic based oxide, the infrared light absorbing material may selectively transmit light of a visible light region and absorb the infrared light. In addition, the infrared light absorbing material may include, for example, an organic based dye. The organic based dye may be, for example, a dye used in a color filter that may be included in the display panel 100.

For example, the infrared light blocking material may be at least one selected from a borate mixture, a carbonate mixture, an alumina mixture, a nitrate mixture, a nitrite mixture, lithium borate and sodium borate, potassium borate, magnesium borate, calcium borate, strontium borate, barium borate, sodium borate, $Na_2B_4O_x$, colemanite, lithium carbonate, sodium carbonate, potassium carbonate, calcium carbonate, calcite, $CaCO_3$, dolomite, and magnesite. In addition, the infrared light blocking material may be at least one selected from one group selected from a nickel dithiol system, a dithiol based metal complex compound, a cyanine system, a squalium system, a croconium system, a diimonium system, an aminium system, an ammonium system, a phthalocyanine system, a naphthalocyanine system and naphthalocyanine system, aminium system, anthraquinone system, a naphthoquinone system, a polymer condensation azo based pyrrole, a polymethine system, and a propylene system.

When the fingerprint of the user is placed (or positioned) on a display surface (for example, one surface on which an image is displayed) of the display device, the display device may sense the fingerprint of the user through the light sensor PHS, which will be described in more detail later. When external light is input to the display device while the fingerprint of the user is sensed, the visible light region of the external light is blocked by a hand of the user, but the infrared light may be transmitted through the hand of the user and may be incident on the light sensors PHS. The infrared light incident on the light sensors PHS may be considered as noise, thereby reducing recognition accuracy of light reflected by the hand of the user.

When the second adhesive layer ADL2 includes the infrared light absorbing material and/or the infrared light blocking material as described above, even though the infrared light of the external light transmits the hand of the user, the infrared light is absorbed and/or blocked by the second adhesive layer ADL2, and thus, the infrared light is not incident on the light sensors PHS. In this manner, fingerprint recognition accuracy may be improved.

The second protective layer PTL2 may block inflow of oxygen, moisture, and the like from the outside, and may be provided as a single layer or a multilayer. The second protective layer PTL2 may be configured as a film form to further secure flexibility of the display panel 100. The second protective layer PTL2 may be coupled to the sensor layer PSL through another adhesive layer including a transparent adhesive, such as an OCA.

In some exemplary embodiments, a selective light blocking film may be further provided under the second protective layer PTL2. The selective light blocking film may prevent light from entering into the light sensors PHS of the sensor layer PSL by blocking a specific frequency region, for example, infrared light, of the external light introduced into the display device. However, the inventive concepts are not limited thereto, and in some exemplary embodiments, the selective light blocking film may be provided on any layer of the display device when the selective light blocking film is disposed above the sensor layer PSL. In addition, in some exemplary embodiments, the selective light blocking film may be omitted if an infrared light blocking component is included in the display panel 100.

Figure 4:
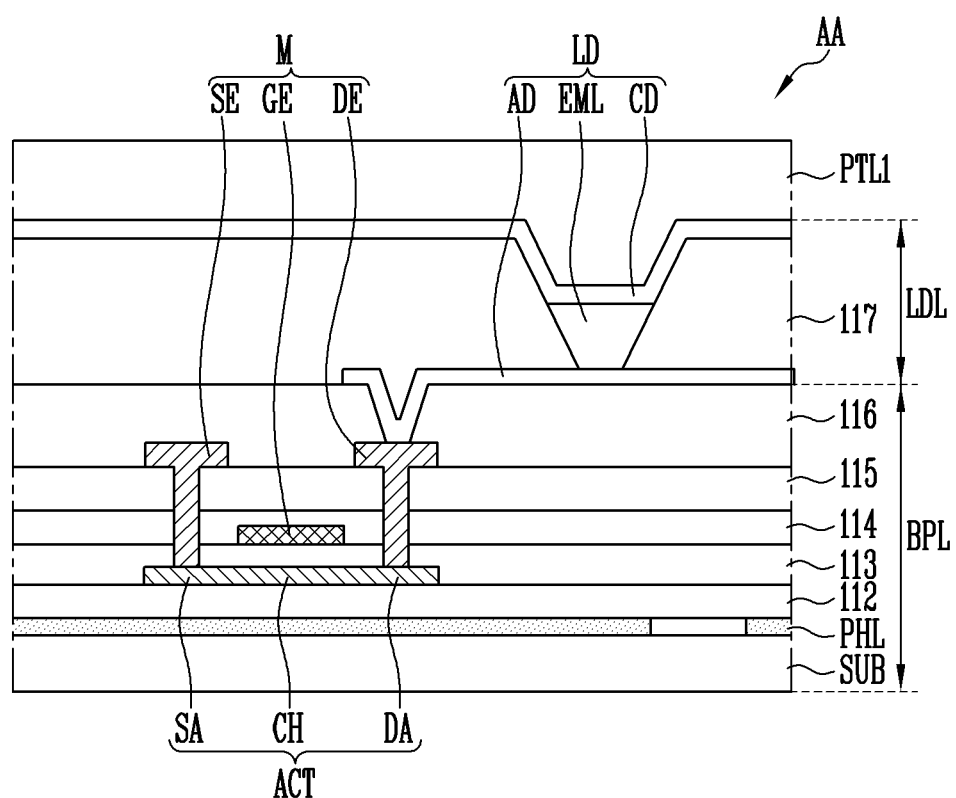
FIG. 4 is an enlarged cross-sectional view of a region BB of FIG. 3.

The light blocking layer PHL may be disposed between the light emitting element layer LDL and the sensor layer PSL, which will be described in more detail later. For example, the light blocking layer PHL may be disposed between the substrate SUB and a buffer layer 112 as shown in FIG. 4. The light blocking layer PHL may include a plurality of pinholes PIH as shown in FIG. 2.

The display panel 100 may be transparent in an area where the pinhole PIH is disposed, so that the reflected light reflected from the fingerprint of the finger may transmit through each pinhole PIH. In addition, in order to reduce loss of the reflected light necessary for the fingerprint sensing, the display panel 100 may be configured so that light that satisfies an observation view (a field of view ("FOV"), or referred to as a "viewing angle") of a predetermined angle range transmits each pinhole PIH.

For example, the display panel 100 may be formed to be transparent in an area that is greater than that of the pinhole PIH and overlapping the pinhole PIH centered on an area where each pinhole PIH is disposed. Hereinafter, an area formed to be transparent so that the reflected light may be transmitted is referred to as an optical opening area OPA.

Based on a center of each pin hole PIH, if a field of view angle of a desired range is θ, a thickness of circuit element layer BPL is q, and a width of the optical opening area OPA formed at a boundary surface of the circuit element layer BPL and the light emitting element layer LDL is 2p, "2p=2×(q×tan θ)" may be satisfied. According to an exemplary embodiment, the field of view may be an angle of a range from about 30 degrees to 60 degrees, for example, 45 degrees, but is not limited thereto.

The pinholes PIH may have a width w in a range of a predetermined width w, for example, about 5 μm to about 20 μm, and a width of the optical opening area OPA in consideration of the width of the pinholes PIH may be 2p+w. In this manner, the width of the optical opening area OPA to be secured in each layer of the display device may be gradually increased as a distance from the light blocking layer PHL is increased (e.g., as each of distances from an upper portion and a lower portion of the light blocking layer PHL is increased).

The width w (or diameter) of the pinholes PIE may be set to about 10 times or more, for example, about 4 μm or about 5 μm or more of a wavelength of the reflected light, so as to prevent diffraction of light. In addition, the width w of the pinholes PIH may be set to a size enough to prevent blurring of an image, and to more clearly sense a shape of the fingerprint. For example, the width w of the pinholes PIH may be set to about 15 μm or less. However, the inventive concepts are not limited thereto, and the width w of the pinholes PIE may be changed according to a wavelength band of the reflected light and/or thicknesses of each layer of the module.

A distance (or pitch) between adjacent pinholes PIE may be set in consideration of a distance between the light blocking layer PHL and the sensor layer PSL, and a wavelength range of the reflected light. For example, if the field of view of the reflected light to be secured is about 45 degrees, the distance between the adjacent pinholes PIH may be set to twice or more the distance between the light blocking layer PHL and the sensor layer PSL, and may be set to a value equal to or greater than a value obtained by adding a predetermined error range to the distance. In this case, the images observed by the respective light sensors PHS may be prevented from overlapping with each other, thereby preventing blurring of an image.

The sensor layer PSL is attached to a rear surface (for example, a back surface) of the display panel 100 so as to overlap at least one area of the display panel 100. The sensor layer PSL may be disposed so as to overlap the display panel 100 in at least the display area AA. The sensor layer PSL may include a plurality of light sensors PHS distributed at a predetermined resolution and/or distance. The distance between the light sensors PHS may be set closely, so that the reflected light reflected from an object to be observed (for example, a specific area of the finger, such as a fingerprint area) may be incident on at least two adjacent light sensors PHS.

The light sensors PHS of the sensor layer PSL may output an electrical signal corresponding to the reflected light received through the pinholes PIH as the sensing signal. The reflected light received by each light sensor PHS may have different optical characteristics (for example, frequency, wavelength, size, and the like) according to whether the reflected light is due to a valley of the fingerprint formed on the finger of the user or due to a ridge thereof. As such, each of the light sensors PHS may output a sensing signal having different electrical characteristics corresponding to the optical characteristics of the reflected light. The sensing signal output by the light sensors PHS may be converted into image data and used for fingerprint identification of the user.

As described above, the display device according to an exemplary embodiment includes the fingerprint sensor including the light emitting element layer LDL, the sensor layer PSL, and the light blocking layer PHL. The light emitting element layer LDL may include the light emitting elements LD that may also function as a light source of a light sensing method sensor. The sensor layer PSL may include the light sensors PHS that receive light emitted from the light emitting element layer LDL and reflected from an object (for example, the fingerprint area of the finger) positioned above the display device. The light blocking layer PHL may include the pinholes PIH disposed between the light emitting element layer LDL and the sensor layer PSL to selectively transmit the reflected light.

The display device according to an exemplary embodiment also utilizes the light emitting elements LD of the pixels PXL as the light source of the fingerprint sensor, but the inventive concepts are not limited thereto. For example, a display device according to another exemplary embodiment may have a separate light source for the fingerprint sensing.

A fingerprint sensing method of the display device 10 according to an exemplary embodiment will be briefly described as follows. During a fingerprint sensing period, during which the light sensors PHS are activated, when the finger (for example, the fingerprint area) of the user is in contact or close to the display area AA, the pixels PXL (more particularly, the light emitting elements LD included in the pixels PXL) of the display area AA may emit light. For example, during the fingerprint sensing period, each of the pixels PXL of the display area AA may be simultaneously or sequentially emit light. Alternatively, only some pixels PXL disposed at predetermined intervals among the pixels PXL of the display area AA emit light, or only some pixels PXL that emit light of a specific color (for example, light having a short wavelength, such as blue light) may selectively emit light.

Some of light emitted from the pixels PXL may be reflected by the finger of the user, and may be incident on the light sensors PHS through the optical opening area OPA and the pinholes PIH formed in each layer of the display device 10. At this time, a fingerprint shape (fingerprint pattern) of the user may be detected based on a light amount difference and/or a waveform of the reflected light reflected from ridges and valleys of each fingerprint.

FIG. 4 is an enlarged cross-sectional view of region BB of FIG. 3. FIG. 4 shows the circuit element layer BPL and the light emitting element layer LDL of the BB region shown in FIG. 3. In particular, FIG. 3 shows the driving transistor M provided in the circuit element layer BPL and the light emitting element LD of the light emitting element layer LDL.

Referring to FIG. 4, the buffer layer 112 may be provided on the substrate SUB. The buffer layer 112 may prevent diffusion of metal atoms or impurities (for example, outgassed) from the substrate SUB. In addition, if a surface of the substrate SUB is not uniform, the buffer layer 112 may improve surface flatness of the substrate SUB. The buffer layer 112 may include an inorganic material, such as an oxide or a nitride, an organic material, or an organic-inorganic composite, and may have a single layer structure or a multilayer structure of an inorganic material and an organic material. For example, the buffer layer 112 may have a structure of at least triple layers formed of silicon oxide, silicon nitride, and silicon oxide.

An active pattern ACT may be provided on the buffer layer 112. The active pattern ACT may include a channel CH. The channel CH may be formed of a semiconductor element.

A first gate insulating layer 113 may be formed on the buffer layer 112 provided with the channel CH. The first gate insulating layer 113 may be a gate insulating layer interposed between the active pattern ACT and a gate electrode GE of the transistor M provided in the pixel PXL.

The first gate insulating layer 113 may include an inorganic film and/or an organic film of one or more layers. For example, the first gate insulating layer 113 may be configured of an inorganic film including $SiO_x$, $SiN_x$, or the like, but is not limited thereto. For example, the first gate insulating layer 113 may include an inorganic insulating material or an organic insulating material, such as $SiO_x$, $SiN_x$, SiON, SiOF, or $AlO_x$, and may be a single film or multiple films including at least one of these materials.

The first gate insulating layer 113 may have a thickness of a predetermined range to easily drive the transistor M. For example, the first gate insulating layer 113 may have a thickness of about 1000 Å to about 1500 Å, for example, about 1200 Å, without being limited thereto.

A first conductive layer may be disposed on the first gate insulating layer 113. According to an exemplary embodiment, the first conductive layer may be a first gate layer. The gate electrode GE of the transistor M may be provided in the first conductive layer. The first conductive layer may be provided with control lines for supplying the scan signal and a light emission control signal to the transistor M, one electrode of the storage capacitor, and the like.

The gate electrode GE and other components disposed in the first conductive layer may be formed of a first gate metal. For example, the first gate metal may include at least one of Ti, Cu, Mo, Al, Au, Cr, TiN, Ag, Pt, Pd, Ni, Sn, Co, Rh, Ir, Fe, Ru, Os, Mn, W, Nb, Ta, Bi, Sb, Pb, and the like. As another example, the first gate metal may include an alloy, such as MoTi or AlNiLa. As another example, the first gate metal may include multiple films, such as Ti/Cu, Ti/Au, Mo/Al/Mo, ITO/Ag/ITO, TiN/Ti/Al/Ti, or TiN/Ti/Cu/Ti.

A second gate insulating layer 114 may be provided on the first conductive layer. For example, the second gate insulating layer 114 may be a first interlayer insulating film interposed between one electrode of the storage capacitor disposed in the first conductive layer and the other electrode of the storage capacitor disposed in a second conductive layer, which will be described in more detail later. The second gate insulating layer 114 may have a thickness of a predetermined range to sufficiently secure a capacity of the storage capacitor in a limited area. According to an exemplary embodiment, the second gate insulating layer 114 may have a thickness similar to that of the first gate insulating layer 113. For example, the second gate insulating layer 114 may have a thickness of about 1000 Å to about 1500 Å, for example, about 1400 Å, without being limited thereto.

The second gate insulating layer 114 may include an inorganic film and/or an organic film of one or more layers. For example, the second gate insulating layer 114 may include an inorganic film including $SiO_x$, $SiN_x$, or the like, but is not limited thereto. As another example, the second gate insulating layer 114 may include an inorganic insulating material or an organic insulating material, such as $SiO_x$, $SiN_x$, SiON, SiOF, or $AlO_x$, and may be formed as a single film or multiple films including at least one of these materials.

The second conductive layer may be disposed on the second gate insulating layer 114. According to an exemplary embodiment, the second conductive layer may be a second gate layer. The second conductive layer may be provided with the other electrode of the storage capacitor. In addition, an initialization power line for supplying initialization power to the pixel PXL may be provided in the second conductive layer.

The gate electrode GE of the transistor M may be provided in the second conductive layer. The second conductive layer may be provided with control lines for supplying the scan signal and the light emission control signal to the transistor M, one electrode of the storage capacitor, and the like.

An interlayer insulating layer 115 may be provided on the second conductive layer. According to an exemplary embodiment, the interlayer insulating layer 115 may be a second interlayer insulating film. The interlayer insulating layer 115 may have a thickness greater than that of the first gate insulating layer 113 and the second gate insulating layer 114. For example, the thickness of the interlayer insulating layer 115 may be equal to or greater than a sum of the thickness of the first gate insulating layer 113 and the thickness of the second gate insulating layer 114. For example, the interlayer insulating layer 115 may have a thickness of about 5000 Å, without being limited thereto. As described above, if the interlayer insulating layer 115 is formed to have a sufficient thickness that is greater than the sum of the thickness of the first gate insulating layer 113 and the thickness of the second gate insulating layer 114, electrical stability between components disposed under and on the interlayer insulating layer 115 may be secured, thereby effectively preventing the occurrence a short defect.

The interlayer insulating layer 115 may include an inorganic film and/or an organic film of one or more layers. For example, the interlayer insulating layer 115 may include an inorganic film including $SiO_x$, $SiN_x$, or the like, without being limited thereto. For example, the interlayer insulating layer 115 may include an inorganic insulating material or an organic insulating material, such as $SiO_x$, $SiN_x$, SiON, SiOF, or $AlO_x$, and may be formed as a single film or multiple films including at least one of these materials.

A third conductive layer may be disposed on the interlayer insulating layer 115. According to an exemplary embodiment, the third conductive layer may be a source-drain layer. A source electrode SE and a drain electrode DE of the transistor M may be provided in the third conductive layer. Control lines for supplying a data signal and driving power to the transistor M may be provided in the third conductive layer.

The source electrode SE may be connected to a source region SA of the active pattern ACT through a contact hole passing through the first gate insulating layer 113, the second gate insulating layer 114, and the interlayer insulating layer 115. The drain electrode DE may be connected to a drain region DA of the active pattern ACT through a contact hole passing through the first gate insulating layer 113, the second gate insulating layer 114, and the interlayer insulating layer 115.

A protective layer 116 may be provided on the third conductive layer. The protective layer 116 may include a passivation film and/or a planarization film. According to an exemplary embodiment, the protective layer 116 may have a thickness of 1500 Å to 1800 Å, for example, about 1600 Å, without being limited thereto.

The light emitting element LD may be provided on the protective layer 116. The light emitting element LD may include a first electrode AD and a second electrode CD, and a light emitting layer EML provided between the first and second electrodes AD and CD.

At least one of the first electrode AD and the second electrode CD may be a transmissive electrode. For example, if the light emitting element LD is a back surface light emitting type organic light emitting display element, the first electrode AD may be a transmissive electrode and the second electrode CD may be a reflective electrode. Alternatively, if the light emitting element LD is a front surface light emitting type organic light emitting display element, the first electrode may be a reflective electrode and the second electrode may be a transmissive electrode. In addition, if the light emitting element LD is a both surface light emitting type organic light emitting display element, both of the first electrode AD and the second electrode CD may be transmissive electrodes. Hereinafter, the light emitting element LD will exemplarily be described as a front surface light emitting type organic light emitting display element, and the first electrode AD will exemplarily be described as an anode electrode. In addition, in the illustrated embodiment, the light emitting element LD is described as being used as a light source, but the inventive concepts are not limited thereto. For example, in some exemplary embodiments, the light emitting element LD may be replaced with another type of light emitting element.

The first electrode AD may be provided on the protective layer 116. The first electrode AD may be connected to one electrode of the transistor M, for example, the drain electrode DE, through a contact hole passing through the protective layer 116.

The first electrode AD may include a reflective film capable of reflecting light, and a transparent conductive film disposed on or under the reflective film.

The light emitting layer EML may be disposed on an exposed surface of the first electrode AD. The light emitting layer EML may have a multilayer thin film structure including a light generation layer. For example, the light emitting layer EML may include a hole injection layer for injecting holes, a hole transport layer for increasing a hole recombination opportunity by suppressing movement of electrons while having excellent transportability of holes that are not combined in the light generation layer, the light generation layer for emitting light by recombination of the injected electrons and holes, a hole blocking layer for suppressing the movement of the holes that are not combined in the light generation layer, an electron transport layer for smoothly transporting the electrons to the light generation layer, and/or an electron injection layer for injecting the electrons.

The color of light generated in the light generation layer may be one of red, green, blue, and white, without being limited thereto. For example, the color of light generated in the light generating layer of the light emitting layer EML may be one of magenta, cyan, and yellow.

The hole injection layer, the hole transport layer, the hole blocking layer, the electron transport layer, and the electron injection layer may be a common film connected with each other in adjacent light emitting areas.

The second electrode CD may be a transflective film. For example, the second electrode CD may be a thin film metal layer having a thickness enough to transmit light emitted from the light emitting layer EML. For example, the second electrode CD may transmit some of light emitted from the light emitting layer EML and reflect the remaining light emitted from the light emitting layer EML.

A pixel definition film (or bank layer) 117 for partitioning the light emitting area of each pixel PXL may be provided on the substrate SUB, on which the first electrode AD and the like are disposed. The pixel definition film 117 may expose an upper surface of the first electrode AD and may be protruded from the substrate SUB along a circumference of each light emitting area.

The light blocking layer PHL may be disposed between the substrate SUB and the buffer layer 112 to selectively transmit incident light. The light blocking layer PHL may be an opaque metal layer including one or more pinholes PIH.

According to an exemplary embodiment\, the light blocking layer PHL may be connected to any one of the conductive layers disposed in the circuit element layer BPL to receive power. For example, the light blocking layer PHL may be connected to at least one of the control lines provided in the conductive layers in the display area AA to receive power. Alternatively, the light blocking layer PHL may be connected to at least one of the control lines provided in the conductive layers in the non-display area NA to receive power.

Alternatively, in some exemplary embodiments, the light blocking layer PHL may receive control power through the third power line PL3 provided in the non-display area NA as shown in FIGS. 1A and 1B. The control power may be applied to the light blocking layer PHL during the display period, in which the image is displayed through the pixels PXL, and/or the fingerprint sensing period, in which the fingerprint sensing is performed using the pixels PXL as the light source.

When power is applied to the light blocking layer PHL, an electromagnetic field may be formed around the light blocking layer PHL. Such an electromagnetic field may generate a field effect in peripheral circuit elements, for example, the transistor M. When a characteristic of the transistor M changes due to the electric field effect, an operation characteristic of the display panel 100 may also be changed, which will be described in more detail below.

FIGS. 5 to 8 are graphs illustrating the characteristic change of the transistors in the circuit element layer due to a voltage applied to the present light blocking layer.

As described above with reference to FIG. 4, when the power is applied to the light blocking layer PHL, an electrical characteristic of at least one circuit element, for example, the transistor M provided in the circuit element layer BPL may change.

Figure 5:
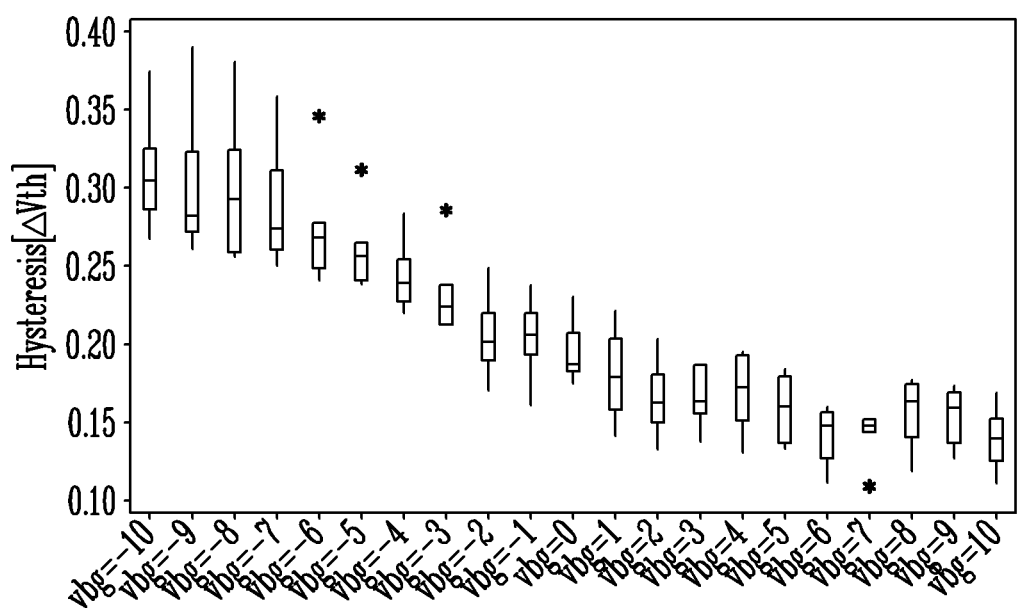
FIGS. 5, 6, 7, and 8 are graphs for describing a characteristic change of transistors in a circuit element layer due to a voltage applied to the present light blocking layer.

More particularly, as shown in FIG. 5, a field effect of the light blocking layer PHL may be changed according to a level of power vbg applied to the light blocking layer PHL, and a hysteresis characteristic of the transistor M included in the circuit element layer BPL may change. For example, when the level of the power vbg applied to the light blocking layer PHL increases, the hysteresis characteristic of the transistor M may decrease.

When the hysteresis characteristic of the transistor M included in the circuit element layer BPL increases, the light emitting element LD may not emit light at a desired luminance, and thus, an afterimage of a previous image (e.g., a previously displayed fixed image) may be left, when an image switching occurs after a fixed image (e.g., a still image) is displayed on the display panel 100. This is referred to as an afterimage problem. The afterimage may last for several seconds on the display panel 100 and may be visually recognized by the user.

As shown in FIG. 5, if high potential power is applied to the light blocking layer PHL, and thus, the hysteresis characteristic of the transistor M decreases, an instantaneous afterimage problem may be improved when the fixed image is displayed.

Figure 6:
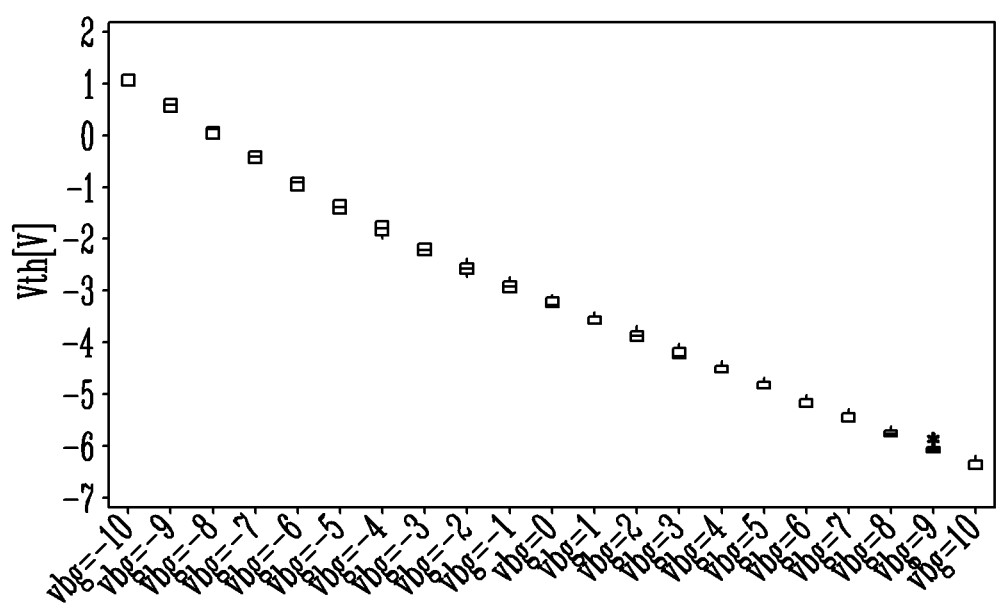

In addition, as shown in FIG. 6, the field effect of the light blocking layer PHL may be changed according to the level of the power vbg applied to the light blocking layer PHL, and a threshold voltage characteristic of the transistor M included in the circuit element layer BPL may change. For example, when the level of the power vbg applied to the light blocking layer PHL increases, a threshold voltage of the transistor M may decrease.

Figure 7:
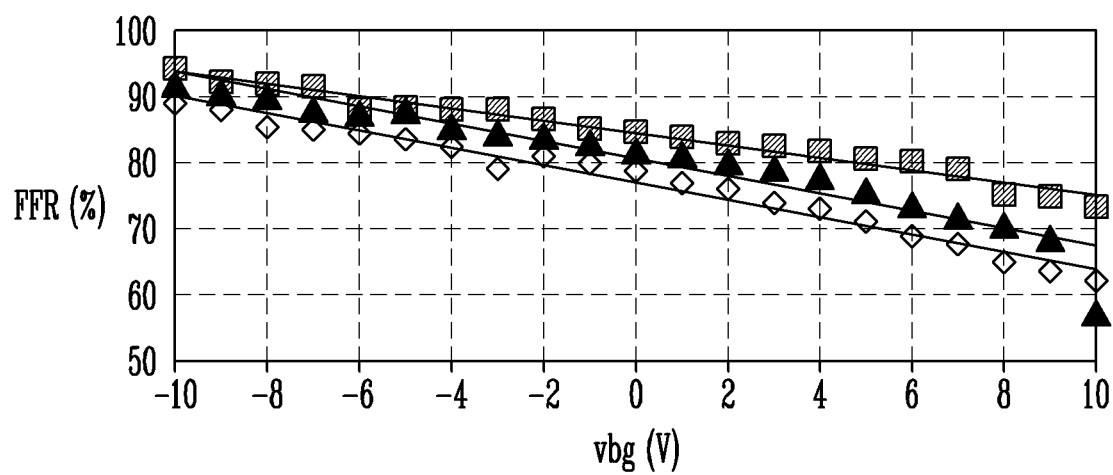

As shown in FIG. 7, when the characteristic of the transistor M included in the circuit element layer BPL is changed according to the level of the power vbg applied to the light blocking layer PHL, a first frame response (FFR) characteristic of the pixel PXL may change. For example, when the level of the power vbg applied to the light blocking layer PHL increases, an FFR of the pixel PXL may decrease.

When a grayscale of the image rapidly changes every frame as the dynamic image is displayed on the display panel 100, a step efficiency problem, in which a grayscale change is not performed quickly may occur, when the FFR increases. As shown in FIG. 7, when high potential control power PHLV is applied to the light blocking layer PHL, and thus, the FFR of the pixel PXL decreases, the step efficiency problem may be improved when the dynamic image is displayed.

Figure 8:
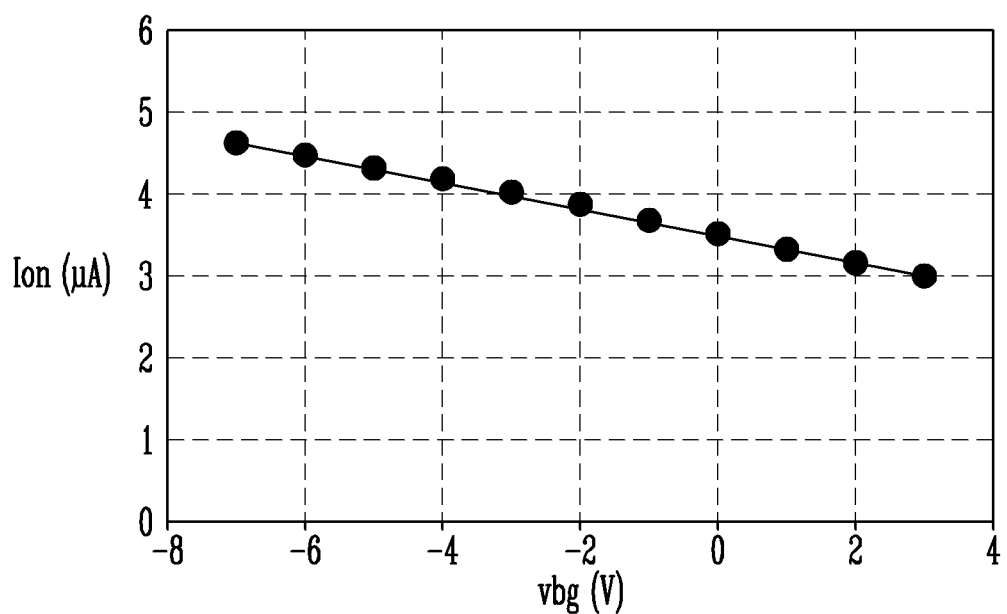

As shown in FIG. 8, when the characteristic of the transistor M included in the circuit element layer BPL changes according to the level of the power vbg applied to the light blocking layer PHL, a current amount Ion flowing through the light emitting element LD connected to the transistor M may change. For example, when the level of the power vbg applied to the light blocking layer PHL decreases, the current amount Ion flowing through the light emitting element LD connected to the transistor M may increase. When the current amount Ion flowing through the light emitting element LD changes, an amount (or intensity) of the light emitted from the light emitting element LD may change.

When the amount (or intensity) of the light emitted from the light emitting element LD increases while the fingerprint sensing is performed (e.g., during the fingerprint sensing period), an amount of reflected light incident on the pinholes PIH of the light blocking layer PHL may increase. As such, an amount (or intensity) of light that passes through the pinholes PIH and reaches the light sensors PHS of the sensor layer PSL may also increase. Therefore, the light sensors PHS may output the sensing signal based on the optical characteristic of the larger amount of the reflected light, and the accuracy of fingerprint sensing based on the sensing signal may be improved.

Hereinafter, the field effect provided to the transistor M when power is applied to the light blocking layer PHL will be described in more detail.

Figure 9:
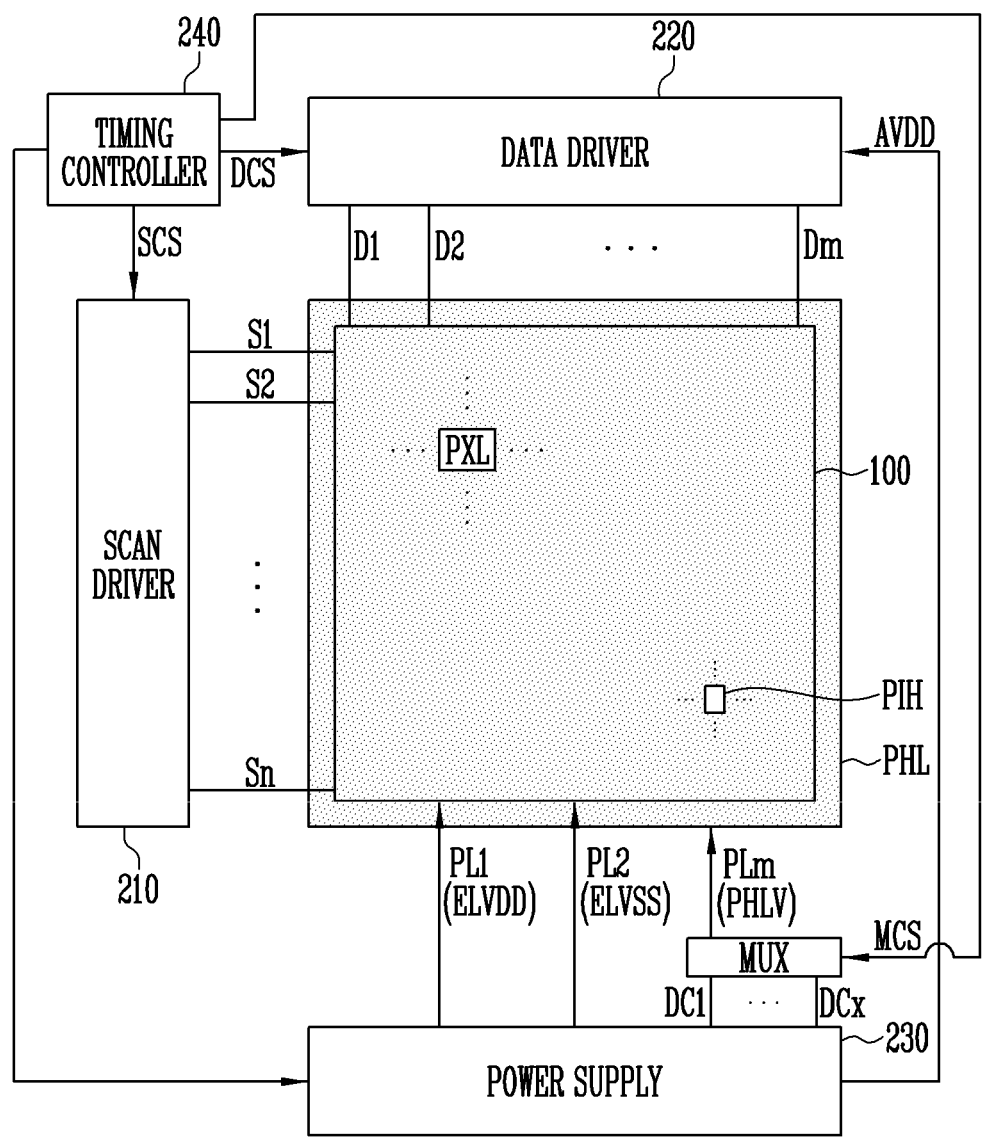
FIG. 9 is a schematic block diagram of a display device according to an exemplary embodiment.

FIG. 9 is a block diagram schematically illustrating a configuration of the display device according to an exemplary embodiment. The configuration of the display device shown in FIG. 9 may correspond to that shown in FIG. 1A.

Referring to FIG. 9, the display device according to an exemplary embodiment includes the display panel 100 including the display area AA, the scan driver 210, the data driver 220, the power supply 230, and the timing controller 240. In addition, the display device may further include the light blocking layer PHL disposed in the display panel 100.

The timing controller 240 may generate a scan driving control signal SCS, a data driving control signal DCS, a power driving control signal PCS, and a multiplexer control signal MCS based on signals input from the outside. The scan driving control signal SCS, the data driving control signal DCS, the power driving control signal PCS, and the multiplexer control signal MCS generated by the timing controller 240 may be supplied to the scan driver 210, the data driver 220, the power supply 230, and the multiplexer MUX, respectively.

The scan driving control signal SCS may include a scan start pulse and clock signals. The scan start pulse may control an output timing of a first scan signal, and the clock signals may control output timings of the scan signals.

The data driving control signal DCS may include a source start pulses and clock signals. The source start pulse may control a sampling start time of data, and the clock signals may be used to control a sampling operation.

The power control signal PCS may include an enable signal. The enable signal may control a data driving voltage generation timing of the power supply 230.

The multiplexer control signal MCS may be used to determine a value of the control power PHLV supplied to the light blocking layer PHL. The multiplexer control signal MCS may be set to have a signal characteristic (for example, signal magnitude, level, frequency, period, and the like) that corresponds to a type (for example, the fixed image and the dynamic image) of the image data DATA during the display period, in which the image corresponding to the image data DATA is displayed on the display panel 100. Alternatively, the multiplexer control signal MCS may be set to have a signal characteristic corresponding to the fingerprint sensing period during the fingerprint sensing period.

The scan driver 210 may output the scan signal in correspondence with the scan driving control signal SCS. The scan driver 210 may supply the scan signal to scan lines S1 to Sn. The scan signal may be sequentially or simultaneously applied to the scan lines S1 to Sn.

The data driver 220 may supply data signals to the data lines D1 to Dm in correspondence with the data driving control signal DCS. The data signals supplied to the data lines D1 to Dm may be applied to the pixels PXL of a pixel column selected by the scan signal. To this end, the data driver 220 may supply the data signals to the data lines D1 to Dm in synchronization with the scan signal.

The data driver 220 may apply the data signals corresponding to image data provided from the outside to the data lines D1 to Dm during the display period in one frame.

The power supply 230 may receive the input voltage from the outside, convert the input voltage into the driver driving power AVDD in response to the power driving control signal PCS, and supply the driver driving power AVDD to the data driver 220. In addition, the power supply 230 may generate first panel driving power ELVDD and second panel driving power ELVSS from the driver driving power AVDD.

The power supply 230 may supply the first panel driving power ELVDD to the pixels PXL through the first power line PL1, and supply the second panel driving power ELVSS to the pixels PXL through the second power line PL2. According to an exemplary embodiment, the first panel driving power ELVDD may be set to a voltage greater than that of the second panel driving power ELVSS. For example, the first panel driving power ELVDD may be about 25 to about 27 V, and the second panel driving power ELVSS may be about −7 to about −5 V. According to an exemplary embodiment, the second panel driving power ELVSS may be delayed than the first panel driving power ELVDD and may be supplied to the display panel 100.

According to an exemplary embodiment, the power supply 230 may generate the highest gamma voltage and the lowest gamma voltage required for driving the data driver 220 from the driver driving power AVDD, and may supply the highest gamma voltage and the lowest gamma voltage to the data driver 220. In addition, the power supply 230 may generate a high DC voltage and a low DC voltage required for driving the scan driver 210, and may supply the high DC voltage and the low DC voltage to the scan driver 210.

According to an exemplary embodiment, the power supply 230 may generate a plurality of powers DC1 to DCx having different levels from the driver driving power AVDD, or separate power supplied from the outside. The powers DC1 to DCx may be DC powers, but are not limited thereto. In some exemplary embodiments, some of the powers DC1 to DCx may have a positive value, and some may have a negative value.

The multiplexer MUX may receive the powers DC1 to DCx from the power supply 230. The multiplexer MUX may select any one of the powers DC1 to DCx based on the multiplexer control signal MCS provided from the timing controller 240, and may apply the selected power to the light blocking layer PHL as the control power PHLV.

According to an exemplary embodiment, if the image output through the pixels PXL is the fixed image that is equally remained in a plurality of frames, the control power PHLV may be selected as a relatively high value, for example, a positive value. Alternatively, in some exemplary embodiments, if the image output through the pixels PXL is the dynamic image that changes every frame or several frames, the control power PHLV may be selected as a relatively low value, for example, a negative value. Alternatively, in other exemplary embodiments, when the fingerprint sensing is performed, the control power PHLV may be selected as a relatively low value, for example, a negative value.

The display panel 100 may include a plurality of pixels PXL connected to the data lines D1 to Dm and the scan lines S1 to Sn. A plurality of scan lines S1 to Sn may be connected to the pixel PXL in correspondence with a circuit structure of the pixel PXL. The pixels PXL may receive the first panel driving power ELVDD and the second panel driving power ELVSS from the power supply 230.

Each of the pixels PXL may receive a data signal from a corresponding data line when a scan signal is supplied through a corresponding scan line during the display period. The pixel PXL receiving the data signal may control an amount of a current flowing from the first panel driving power ELVDD to the second panel driving power ELVSS through a light emitting element in correspondence with the data signal. At this time, the light emitting element may generate light of a predetermined luminance corresponding to the amount of the current.

The light blocking layer PHL may be disposed in the display panel 100. At least a portion of the pinholes PIH formed in the light blocking layer PHL may overlap the pixels PXL, or may be disposed adjacent to the pixels PXL.

The light blocking layer PHL may have a size greater than that of the display area AA, in which the pixels PXL are disposed, and thus, a portion of the light blocking layer PHL may overlap the display area AA. However, the inventive concepts are not limited thereto, and in some exemplary embodiments, the light blocking layer PHL may have the same size the display area AA, or may have a size less than that of the display area AA, and thus, the light blocking layer PHL may overlap at least a portion of the pixels PXL.

The light blocking layer PHL may receive the control power PHLV through the third power line PL3. When the light blocking layer PHL receives the control power PHLV, a field effect may be generated in the pixels PXL overlapping the light blocking layer PHL, or disposed adjacent to the light blocking layer PHL. The characteristics of the circuit elements, for example, the transistor provided in the pixel PXL may be changed due to the field effect.

Figure 10A:
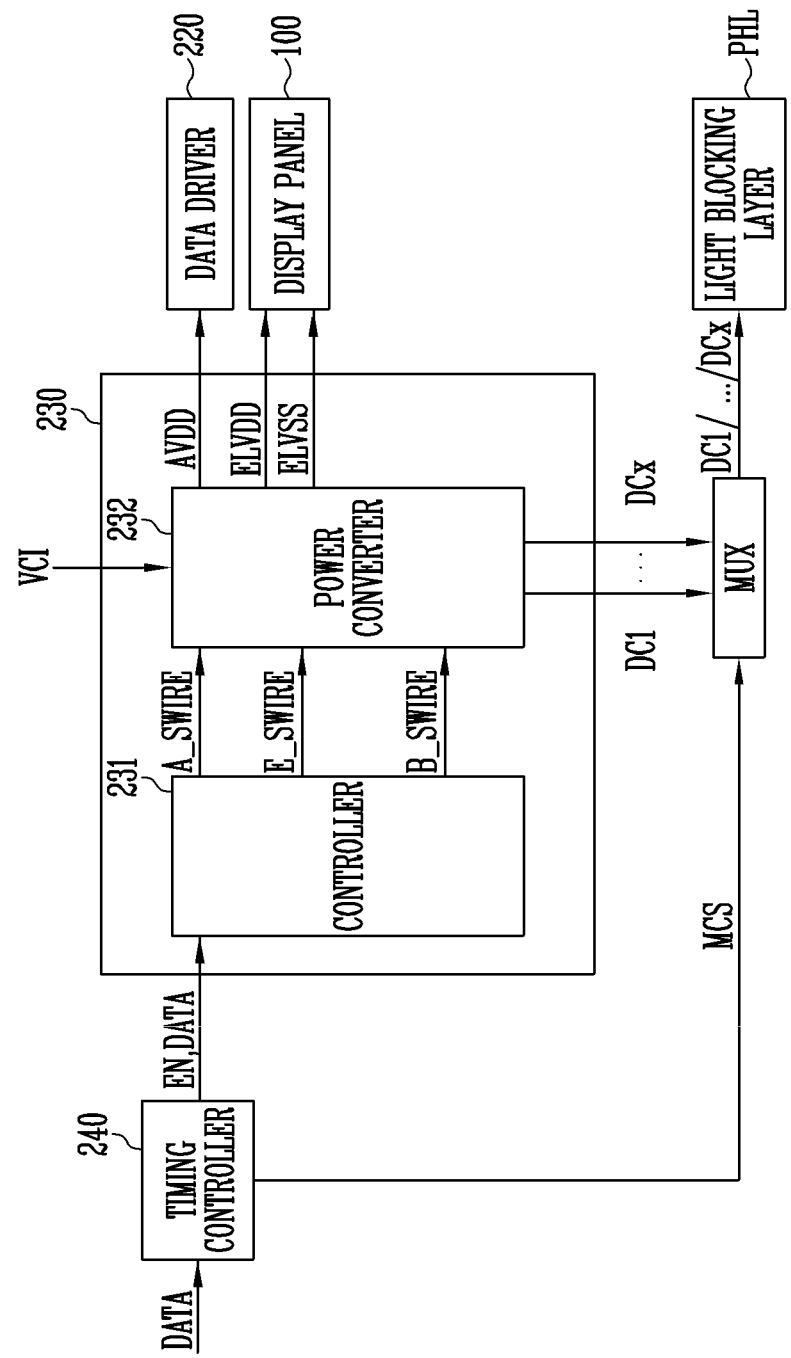
FIGS. 10A and 10B are block diagrams of a power supply, a timing controller, and a multiplexer shown in FIG. 9 according to an exemplary embodiment.
Figure 10B:
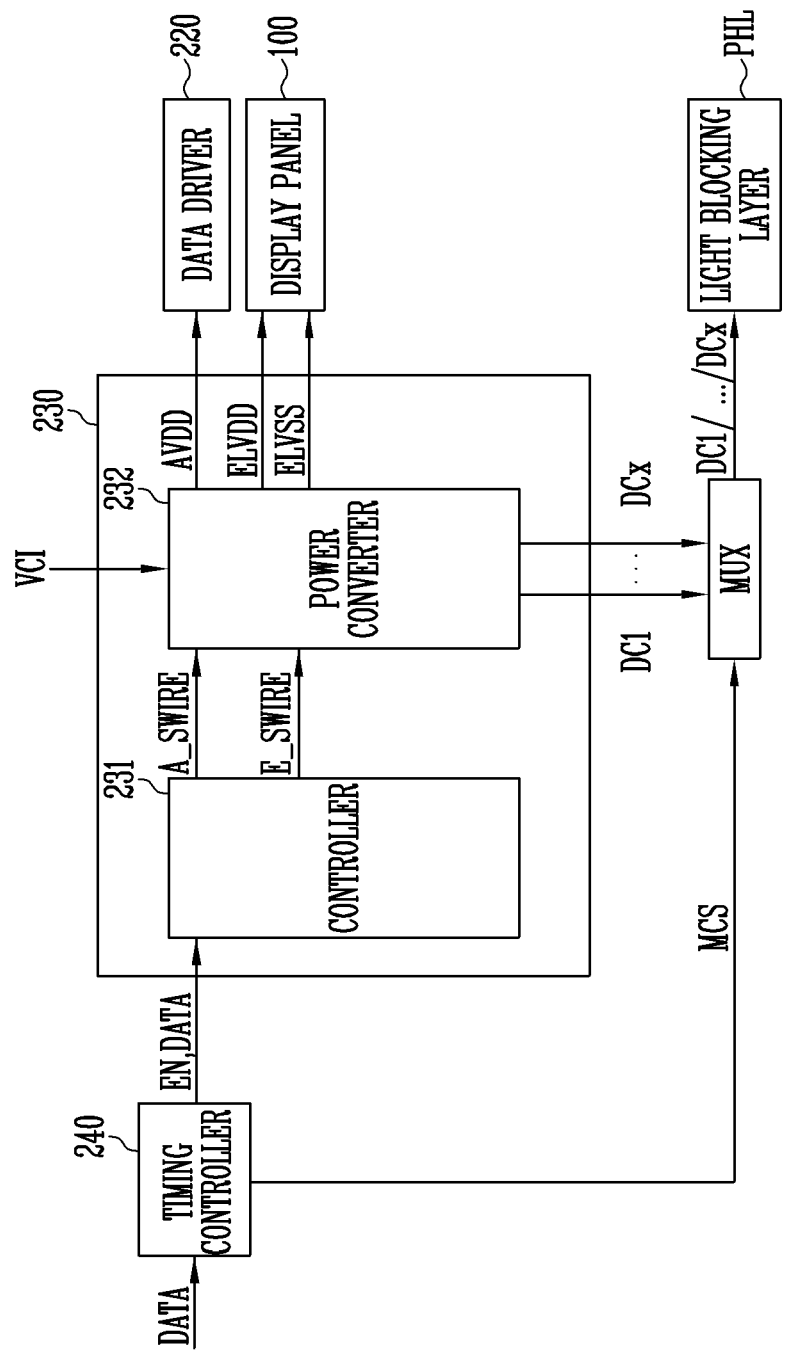
Figure 11:
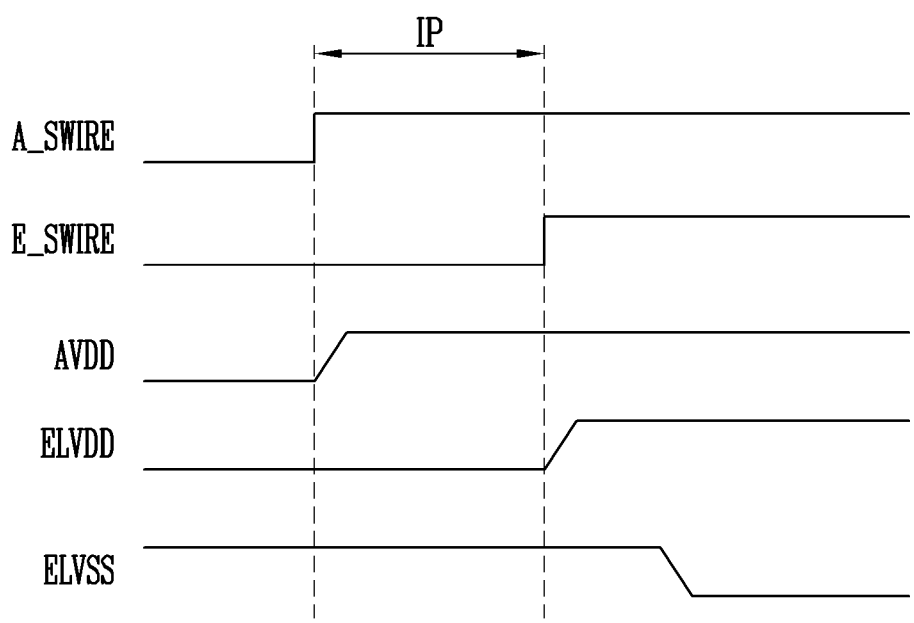
FIG. 11 is a timing diagram illustrating an operation of a power converter shown in FIGS. 10A and 10B.
Figure 12:
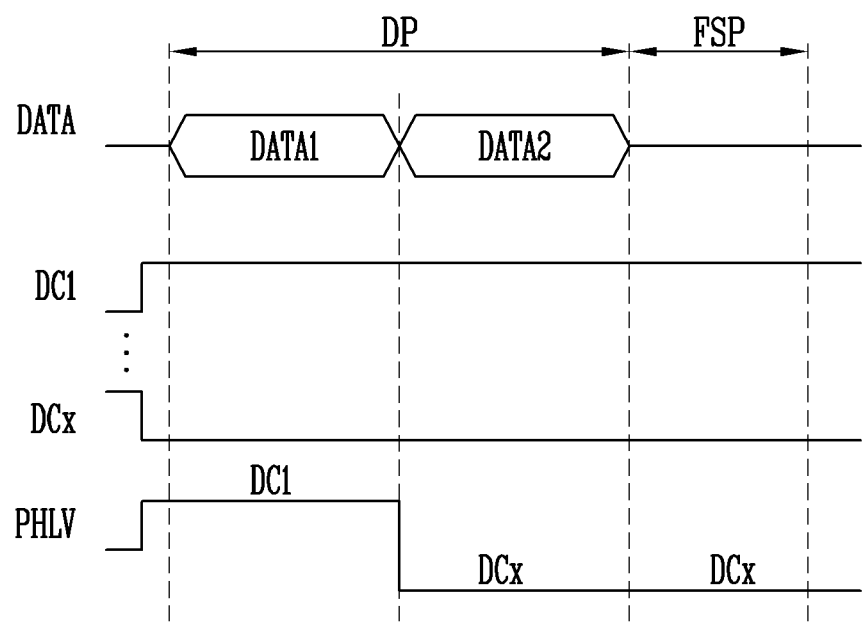
FIG. 12 is a timing diagram illustrating an operation of the multiplexer shown in FIGS. 10A and 10B.

FIGS. 10A and 10B are block diagrams illustrating the power supply, the timing controller, and the multiplexer shown in FIG. 9. FIG. 11 is a timing diagram illustrating an operation of the power converter shown in FIGS. 10A and 10B. FIG. 12 is a timing diagram illustrating an operation of the multiplexer shown in FIGS. 10A and 10B.

Referring to FIGS. 10A and 10B, the power supply 230 may include a controller 231 and a power converter 232.

The controller 231 may generate a first control signal A_SWIRE and a second control signal E_SWIRE based on the enable signal EN supplied from the timing controller 240, and may transfer the generated first control signal A_SWIRE and the second control signal E_WIRE to the power converter 232. The controller 231 may control a timing at which the driver driving power AVDD is supplied to the data driver 220 by controlling an activation time (for example, at a time at which the first control signal A_SWIRE is set to a logic high level) of the first control signal A_SWIRE. In addition, the controller 231 may control a timing at which the first panel driving power ELVDD and the second panel driving power ELVSS are supplied to the display panel 100 by controlling an activation time (for example, a time at which the second control signal E_SWIRE is set to a logic high level) of the second control signal E_SWIRE.

According to an exemplary embodiment, the second control signal E_SWIRE may be activated after a preset initial driving period IP, after the first control signal A_SWIRE is activated. In some exemplary embodiments, sensing, abnormal state detection, and the like of the display panel 100 may be performed during the initial driving period IP.

According to an exemplary embodiment, the controller 231 may further generate a third control signal B_SWIRE and transfer the generated third control signal B_SWIRE to the power converter 232. The controller 231 may control a timing at which the plurality of powers DC1 to DCx are generated and/or a timing at which the plurality of powers DC1 to DCx are supplied to the multiplexer MUX by controlling an activation timing (for example, a time at which the third control signal B_SWIRE is set to a logic high level) of the third control signal B_SWIRE. Alternatively, the controller 231 may control values of the plurality of powers DC1 to DCx to be generated, by controlling a signal characteristic (for example, a signal size, level, frequency, period, or the like) of the third control signal B_SWIRE. When the plurality of powers DC1 to DCx are set to a fixed value, as shown in FIG. 10B, the third control signal B_SWIRE for controlling the values of the plurality of powers DC1 to DCx may be omitted.

The power converter 232 may convert an input voltage VCI supplied from the outside into the driver driving power AVDD. To this end, the power converter 232 may include a boost DC-DC converter and/or an inverting buck-boost DC-DC converter. When the activated first control signal A_SWIRE is supplied from the controller 231, the power converter 232 may supply the driver driving power AVDD to the data driver 220 in response to the activated first control signal A_SWIRE.

According to an exemplary embodiment, the power converter 232 may receive the driver driving power AVDD from the outside, instead of directly generating the driver driving power AVDD. In this case, the power supply 230 may be connected to a battery or a power provider for supplying the driver driving power AVDD, or may include a battery or a power provider.

The power converter 232 may convert the driver driving power AVDD to generate the first panel driving power ELVDD and the second panel driving power ELVSS. According to an exemplary embodiment, the first panel driving power ELVDD may be about 25 to about, and the second panel driving power ELVSS may be about −7 to about −5 V.

As such, the power converter 232 may include a plurality of regulators, such as a low-dropout regulator. Some of the regulators may generate the first panel driving power ELVDD and the second panel driving power ELVSS based on the driver driving voltage AVDD. When the activated second control signal E_SWIRE is supplied from the controller 231, the power converter 232 may supply the first panel driving power ELVDD and the second panel driving power ELVSS to the display panel 100 in response to the activated second control signal E_SWIRE.

According to an exemplary embodiment, some of the regulators may generate the highest gamma voltage and the lowest gamma voltage required for driving the data driver 220 from the driver driving power AVDD. In addition, some of the regulators may generate a high DC voltage and a low DC voltage required for driving the scan driver 210 shown in FIG. 9 from the driver driving power AVDD.

According to an exemplary embodiment, the power converter 232 may generate the plurality of powers DC1 to DCx in response to the third control signal B_SWIRE supplied from the controller 231. According to control of the third control signal B_SWIRE, the plurality of powers DC1 to DCx may have different specific values. According to an exemplary embodiment, some of the plurality of powers DC1 to DCx may have a positive value and others may have a negative value according to the control of the third control signal B_SWIRE. The specific values and the number of the plurality of powers DC1 to DCx are not particularly limited, and the plurality of powers DC1 to DCx may be set to appropriate candidate values required for inducing a characteristic change of the transistor M shown in FIGS. 5 to 7.

The power converter 232 may supply the generated plurality of powers DC1 to DCx to the multiplexer MUX.

The multiplexer MUX may select any one of the plurality of powers DC1 to DCx based on the multiplexer control signal MCS supplied from the timing controller 240, and may supply the selected power to the light blocking layer PHL as the control power PHLV.

The multiplexer control signal MCS may determine a signal characteristic (for example, a signal magnitude, level, frequency, period, or the like) based on a type (for example, the fixed image data or the dynamic image data) of the image data DATA input to the timing controller 240 during the display period DP shown in FIG. 12.

According to an exemplary embodiment, when the image data DATA to be displayed on the display panel 100 is fixed image data DATA1 that is equally remained during a plurality of frames, the multiplexer control signal MCS may be set to have a first signal characteristic. When the multiplexer control signal MCS having the first signal characteristic is supplied, the multiplexer MUX may select a control power PHLV of a relatively high value, for example, a positive value, among the plurality of powers DC1 to DCx.

Alternatively, when the image data DATA to be displayed on the display panel 100 is dynamic image data DATA2 that changes every frame or several frames, the multiplexer control signal MCS may be set to have a second signal characteristic. When the multiplexer control signal MCS having the second signal characteristic is supplied, the multiplexer MUX may select a control power PHLV of a relatively low value, for example, a negative value, among the plurality of powers DC1 to DCx.

According to an exemplary embodiment, the multiplexer control signal MCS may be set to have a third signal characteristic during a fingerprint sensing period FSP. When the multiplexer control signal MCS having the third signal characteristic is supplied, the multiplexer MUX may select a control power PHLV of a relatively low value, for example, a negative value, among the plurality of powers DC1 to DCx. In some exemplary embodiments, the third signal characteristic may be substantially the same as the second signal characteristic.

In FIG. 12, the display period DP and the fingerprint sensing period FSP are illustrated as being separated, however, the inventive concepts are not limited thereto. For example, in some exemplary embodiments, the fingerprint sensing period FSP may be included in the display period DP, and in this case, the fingerprint sensing period FSP may be provided in every frame or at least some frames in the display period DP.

The multiplexer MUX may supply the power selected based on the multiplexer control signal MCS, in particular, the control power PHLV, to the light blocking layer PHL.

When the high potential control power having the positive value is supplied to the light blocking layer PHL, the hysteresis characteristics of the adjacent transistors M may be improved by the field effect of the light blocking layer PHL. Then, the afterimage problem of the image (for example, the fixed image) displayed on the display panel 100 may be improved.

In addition, when the high potential control power having the positive value is supplied to the light blocking layer PHL, the amount of the current flowing to the light emitting element LD may increase when the characteristic of the adjacent transistors M changes by the field effect of the light blocking layer PHL. As such, the amount (or intensity) of light in the light emitting element LD may increase.

On the other hand, when the low potential control power having the negative value is supplied to the light blocking layer PHL, the FFR of the pixel PXL may decrease when the characteristic of the adjacent transistors M changes by the field effect of the light blocking layer PHL. Then, the step efficiency problem of the image (for example, the dynamic image) displayed on the display panel 100 may be improved.

Figure 13:
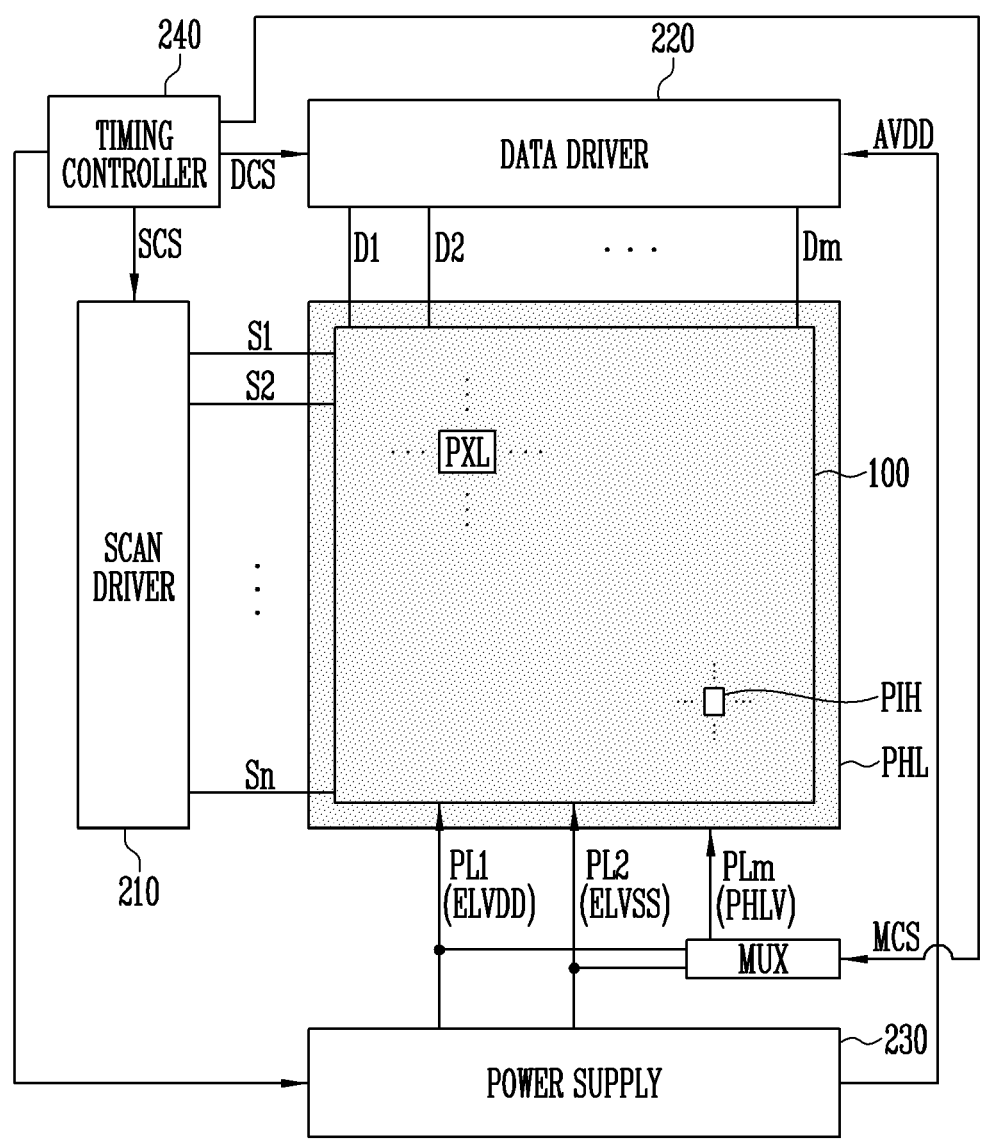
FIG. 13 is a schematic block diagram of a display device according to another exemplary embodiment.

FIG. 13 is a block diagram schematically illustrating a configuration of a display device according to another exemplary embodiment. The configuration of the display device shown in FIG. 13 may correspond to that shown in FIG. 1B.

In comparison with the display device in FIG. 9, in the illustrated embodiment shown in FIG. 13, the power supply 230 may not separately generate a plurality of powers DC1 to DCx.

The multiplexer MUX may be connected to the first power line PL1 and the second power line PL2 to receive the first panel driving power ELVDD and the second panel driving power ELVSS supplied from the power supply 230 to the pixels PXL. The multiplexer MUX may select any one of the first panel driving power ELVDD and the second panel driving power ELVSS based on the multiplexer control signal MCS provided from the timing controller 240, and may apply the selected power to the light blocking layer PHL as the control power PHLV.

According to an exemplary embodiment, when the image output through the pixels PXL is the fixed image that is equally maintained in the plurality of frames, the control power PHLV may be selected as the first panel driving power ELVDD, which is the high potential panel driving power. Alternatively, in some exemplary embodiments, when the image output through the pixels PXL is the dynamic image that changes every frame or several frames, the control power PHLV may be selected as the second panel driving power ELVSS, which is the low potential panel driving power. Still alternatively, in other exemplary embodiments, when the fingerprint sensing is performed, the control power PHLV may be selected as the second panel driving power ELVSS.

Figure 14:
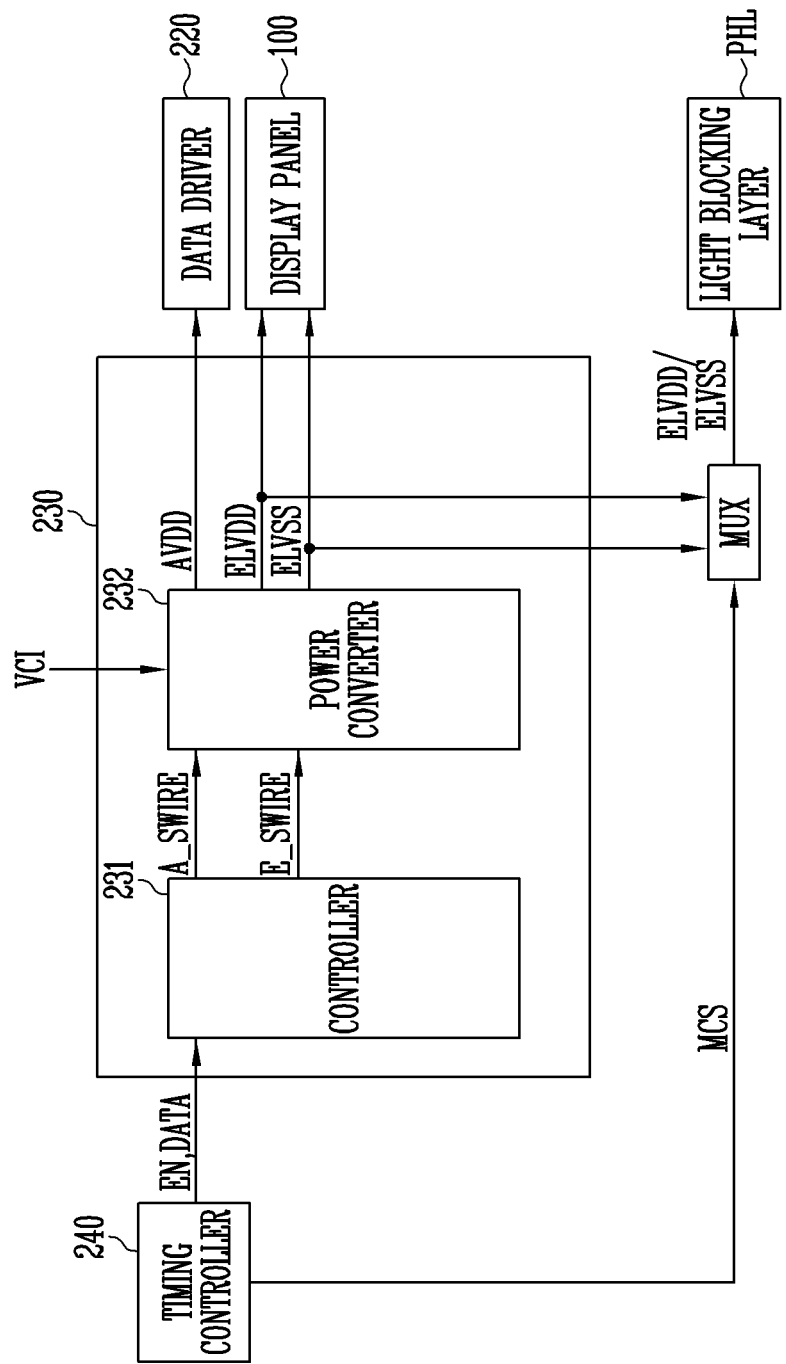
FIG. 14 is a block diagram of a power supply, a timing controller, and a multiplexer shown in FIG. 13 according to another exemplary embodiment.
Figure 15:
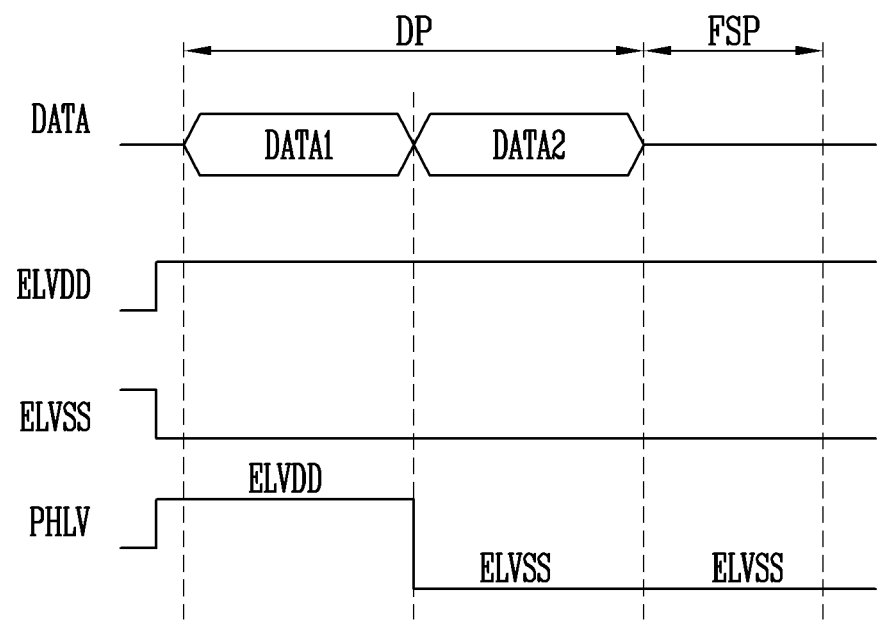
FIG. 15 is a timing diagram illustrating an operation of the multiplexer shown in FIG. 14.

FIG. 14 is a block diagram illustrating the power supply, the timing controller, and the multiplexer shown in FIG. 13. FIG. 15 is a timing diagram illustrating an operation of the multiplexer shown in FIG. 14.

Referring to FIG. 14, the power supply 230 according to the illustrated exemplary embodiment may not generate the third control signal B_SWIRE, as compared to those shown in FIGS. 10A and 10B. As such, the power supply 230 may not generate the plurality of powers DC1 to DCx. The power supply 230 may generate the driver driving power AVDD, the first panel driving power ELVDD, and the second panel driving power ELVSS, and apply the driver driving power AVDD, the first panel driving power ELVDD, and the second panel driving power ELVSS to the data driver 220 and the display panel 100. In addition, the power supply 230 may further supply the generated first panel driving power ELVDD and the second panel driving power ELVSS to the multiplexer MUX.

The multiplexer MUX may select any one of the first panel driving power ELVDD and the second panel driving power ELVSS based on the multiplexer control signal MCS provided from the timing controller 240, and may supply the selected power to the light blocking layer PHL as the control power PHLV. According to an exemplary embodiment, the first panel driving power ELVDD may have a positive value and may be, for example, about 25 to about 27 V. In some exemplary embodiments, the second panel driving power ELVSS may have a negative value and may be, for example, about −7 to about −5 V.

The multiplexer control signal MCS may determine a signal characteristic (for example, a signal magnitude, level, frequency, period, or the like) based on a type (for example, the fixed image data or the dynamic image data) of the image data DATA input to the timing controller 240 during the display period DP shown in FIG. 12.

According to an exemplary embodiment, when the image data DATA to be displayed on the display panel 100 is the fixed image data DATA1 that is equally remained during a plurality of frames, the multiplexer control signal MCS may be set to have a first signal characteristic. When the multiplexer control signal MCS having the first signal characteristic is supplied, the multiplexer MUX may select the first panel driving power ELVDD as the control power PHLV.

Alternatively, when the image data DATA to be displayed on the display panel 100 is the dynamic image data DATA2 that changes every frame or several frames, the multiplexer control signal MCS may be set to have a second signal characteristic. When the multiplexer control signal MCS having the second signal characteristic is supplied, the multiplexer MUX may select the second panel driving power ELVSS as the control power PHLV.

According to an exemplary embodiment, the multiplexer control signal MCS may be set to have a third signal characteristic during a fingerprint sensing period FSP. When the multiplexer control signal MCS having the third signal characteristic is supplied, the multiplexer MUX may select the second panel driving power ELVSS as the control power PHLV. In some exemplary embodiments, the third signal characteristic may be substantially the same as the second signal characteristic.

In the illustrated exemplary embodiment described above, since the generation of additional power is not required in the power supply 230, as compared with that of FIG. 10, a size of the power supply 230 and the display device may be reduced, and power consumption of the display device may be reduced.

Figure 16:
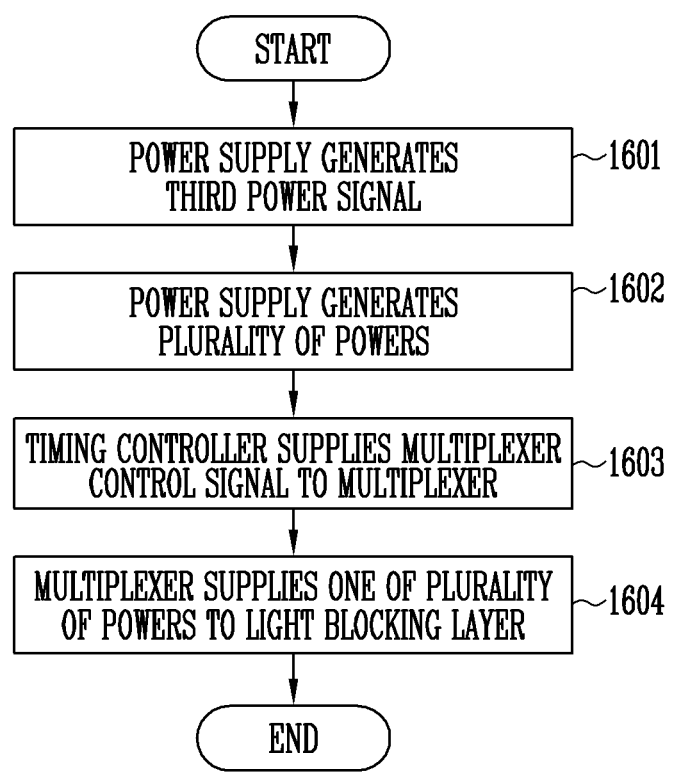
FIG. 16 is a flowchart illustrating a method of driving the display device according to an exemplary embodiment.

FIG. 16 is a flowchart for describing a method of driving the display device according to an exemplary embodiment.

Referring to FIG. 16, the power supply 230 may generate the third control signal B_SWIRE (1601). In an exemplary embodiment, the power supply 230 may generate the third control signal B_SWIRE in response to the power driving control signal PCS provided from the timing controller 240.

The power supply 230 may generate the plurality of powers DC1 to DCx in response to the third control signal B_SWIRE (1602). The power supply 230 may output the generated plurality of powers DC1 to DCx to the multiplexer MUX.

The timing controller 240 may supply the multiplexer control signal MCS to the multiplexer MUX (1603).

The timing controller 240 may determine the type of the image to be displayed on the display panel 100 during the display period DP, and generate the multiplexer control signal MCS corresponding thereto. For example, the timing controller 240 may determine whether the image to be displayed is the fixed image or the dynamic image.

For example, when the received image data DATA and the image data of the preset number of previous frames are the same, the timing controller 240 may determine that the image to be displayed on the display panel 100 is the fixed image. On the other hand, when at least some of the received image data DATA and the image data of the preset number of previous frames are different from each other, the timing controller 240 may determine that the image to be displayed on the display panel 100 is the dynamic image. The timing controller 240 may generate the multiplexer control signal MCS having the signal characteristic corresponding to the determined type of the image.

According to an exemplary embodiment, the timing controller 240 may generate the multiplexer control signal MCS having the signal characteristic corresponding to the fingerprint sensing period FSP during the fingerprint sensing period FSP.

The multiplexer MUX may supply one of the plurality of powers DC1 to DCx to the light blocking layer PHL in correspondence with the multiplexer control signal MCS (1604). For example, the multiplexer MUX may selects an arbitrary power of a high potential (for example, a positive value) in correspondence with the multiplexer control signal MCS of the first signal characteristic corresponding to the fixed image to supply the selected power to light blocking layer PHL. The multiplexer MUX may select an arbitrary power of a low potential (for example, a negative value) in correspondence with the multiplexer control signal MCS of the second signal characteristic corresponding to the dynamic image to supply the selected power to light blocking layer PHL. The multiplexer MUX may an select arbitrary power having a low potential (for example, a negative value) in correspondence with the multiplexer control signal MCS of the third signal characteristic corresponding to the fingerprint sensing period FSP to supply the selected power to light blocking layer PHL.

While the above operation is performed or before the above operation is performed, the power supply 230 may receive the input voltage VCI from the outside, convert the input voltage VCI into the driver driving power AVDD in response to the power driving control signal PCS, and supply the driver driving power AVDD to the data driver 220. In addition, the power supply 230 may generate the first panel driving power ELVDD and the second panel driving power ELVSS from the driver driving power AVDD, and supply the first panel driving power ELVDD and the second panel driving power ELVSS to the display panel 100.

When the power is supplied to the data driver 220 and the display panel 100, the image corresponding to the image data DATA may be displayed through the pixels PXL of the display panel 100. At this time, the characteristic of the transistor M provided in the pixels PXL may be changed by the control power PHLV supplied to the light blocking layer PHL. Therefore, the afterimage problem and the step efficiency problem of the image displayed on the display panel 100 may be improved.

Alternatively, when the power is supplied to the data driver 220 and the display panel 100, the pixels PXL of the display panel 100 may emit light, and the reflected light of the light emitted from the pixels PXL may be incident on the light sensors PHS through the pinholes PIH. When the sensing signal corresponding to the reflected light incident from the light sensors PHS is output, the fingerprint of the user contacting the display panel 100 and generating the reflected light may be detected.

Figure 17:
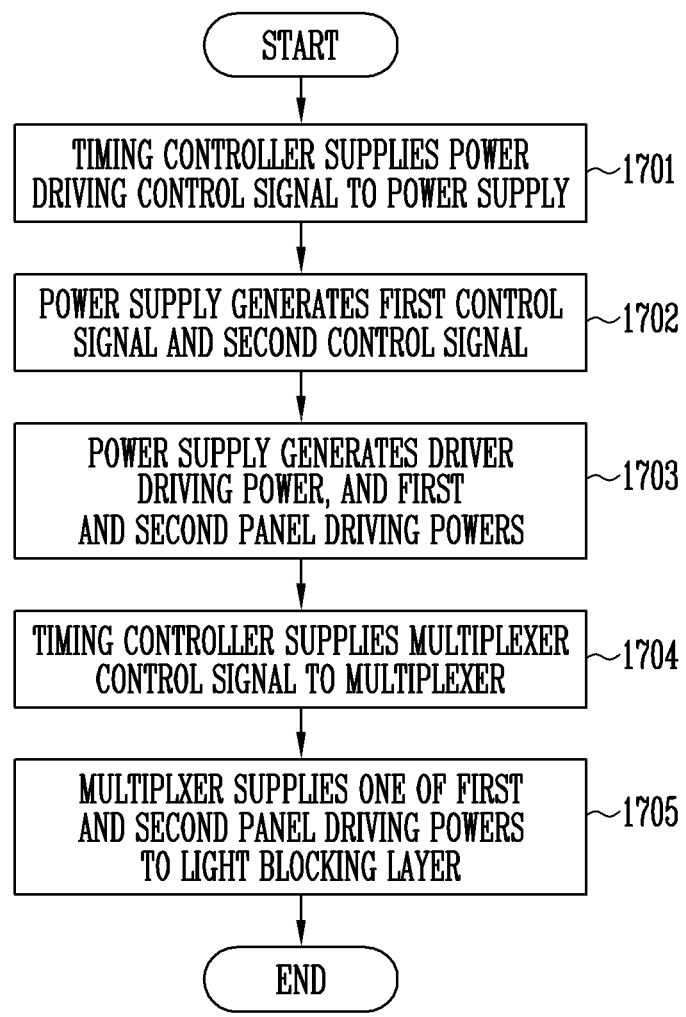
FIG. 17 is a flowchart illustrating a method of driving the display device according to another exemplary embodiment.

FIG. 17 is a flowchart illustrating a method of driving the display device according to another exemplary embodiment.

When the power driving control signal PCS is supplied from the timing controller 240 (1701), the power supply 230 may generate the first and second control signals A_SWIRE and E_SWIRE (1702). The power supply 230 may generate the first and second control signals A_SWIRE and E_SWIRE that are simultaneously or sequentially activated. For example, the power supply 230 may generate the activated first control signal A_SWIRE and generate the activated second control signal E_SWIRE after the predetermined initial driving period IP.

The power supply 230 may generate the driver driving power AVDD, the first panel driving power ELVDD, and the second panel driving power ELVSS (1703). In an exemplary embodiment, the power supply 230 may generate the driver driving power AVDD in response to the generation of the activated first control signal A_SWIRE. In addition, the power supply 230 may generate the first panel driving power ELVDD and the second panel driving power ELVSS in response to the generation of the activated second control signal E_SWIRE. The power supply 230 may apply the driver driving power AVDD, the first panel driving power ELVDD, and the second panel driving power ELVSS to the data driver 220 and the display panel 100. In addition, the power supply 230 may supply the first panel driving power ELVDD and the second panel driving power ELVSS to the multiplexer MUX.

The timing controller 240 may supply the multiplexer control signal MCS to the multiplexer MUX (1704).

The timing controller 240 may determine the type of the image to be displayed on the display panel 100 during the display period DP, and generate the multiplexer control signal MCS corresponding thereto. For example, the timing controller 240 may determine whether the image to be displayed is the fixed image or the dynamic image.

For example, when the received image data DATA and the image data of the preset number of previous frames are the same, the timing controller 240 may determine that the image to be displayed on the display panel 100 is the fixed image. On the other hand, when at least some of the received image data DATA and the image data of the preset number of previous frames are different from each other, the timing controller 240 may determine that the image to be displayed on the display panel 100 is the dynamic image. The timing controller 240 may generate the multiplexer control signal MCS having the signal characteristic corresponding to the determined type of the image.

In an exemplary embodiment, the timing controller 240 may generate the multiplexer control signal MCS having the signal characteristic corresponding to the fingerprint sensing period FSP during the fingerprint sensing period FSP.

The multiplexer MUX may supply one of the first panel driving power ELVDD and the second panel driving power ELVSS to the light blocking layer PHL in correspondence with the multiplexer control signal MCS (1705). For example, the multiplexer MUX may select the first panel driving power ELVDD to supply the first panel driving power ELVDD to the light blocking layer PHL in correspondence with the multiplexer control signal MCS of the first signal characteristic corresponding to the fixed image. The multiplexer MUX may select the second panel driving power ELVSS to supply the second panel driving power ELVSS to the light blocking layer PHL in correspondence with the multiplexer control signal MCS of the second signal characteristic corresponding to the dynamic image. The multiplexer MUX may select the second panel driving power ELVSS to supply the second panel driving power ELVSS to the light blocking layer PHL in correspondence with the multiplexer control signal MCS of the third signal characteristic corresponding to the fingerprint sensing period FSP.

A display device and a method of driving the display device according to the exemplary embodiments may implement thinning while reducing a manufacturing cost of the display device having a fingerprint sensor function by embedding a fingerprint sensor in the display panel.

In addition, a display device and a method of driving the display device according to the exemplary embodiments disclosure may improve a light emission efficiency of organic light emitting diodes in the pixels, and improve accuracy of fingerprint sensing, by applying an electric field effect to the transistors in the pixels through the light blocking layer, and thereby changing the characteristic of the transistors.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel having a display area including a plurality of pixels and a non-display area surrounding at least one side of the display area;
   a light blocking layer at least partially overlapping the display area and including opening portions for selectively passing incident light; and
   a power supply device configured to supply power to the pixels and the light blocking layer,
   wherein the power supply device is configured to apply control power having a different voltage value in correspondence with a type of an image to be displayed in the display area to the light blocking layer, during a display period.

2. The display device according to claim 1, wherein the power supply device is configured to apply:
   first control power to the light blocking layer if the image to be displayed in the display area is a still image; and
   second control power having a voltage value less than a voltage value of the first control power to the light blocking layer if the image to be displayed in the display area is a dynamic image.

3. The display device according to claim 2, wherein the first control power has a positive voltage value, and the second control power has a negative voltage value.

4. The display device according to claim 2, wherein the power supply device is configured to apply third control power having a voltage value less than the voltage value of the first control power to the light blocking layer during a fingerprint sensing period, the third control power having the same voltage value as the second control power or a voltage value different from the voltage value of the second control power.

5. The display device according to claim 1, wherein the power supply device comprises:
   a power converter configured to generate a plurality of powers having different voltage values; and
   a multiplexer configured to apply any one of the plurality of powers to the light blocking layer as the control power.

6. The display device according to claim 5, further comprising a timing controller configured to supply a multiplexer control signal corresponding to the type of the image to be displayed in the display area to the multiplexer.

7. The display device according to claim 6, wherein:
   the plurality of powers include high potential panel driving power and low potential panel driving power for driving the pixels; and
   the multiplexer is configured to apply any one of the high potential panel driving power and the low potential panel driving power to the light blocking layer as the control power based on the multiplexer control signal.

8. The display device according to claim 6, wherein the power supply device further comprises a controller configured to provide a control signal for controlling voltage values of the plurality of powers to the power converter.

9. The display device according to claim 6, wherein:
   the multiplexer is disposed in the non-display area of the display panel; and
   the power converter is disposed on a printed circuit board electrically connected to the display panel.

10. The display device according to claim 9, wherein the display panel comprises:
  a first power line to transfer high potential panel driving power generated by the power converter to the pixels;
  a second power line to transfer low potential panel driving power generated by the power converter to the pixels; and
  a third power line to transmit the control power output from the multiplexer to the light blocking layer.

11. The display device according to claim 10, wherein the multiplexer is electrically connected to the power converter to receive the plurality of power lines from the power converter.

12. The display device according to claim 10, wherein:
  the plurality of powers include the high potential panel driving power and the low potential panel driving power; and
  the multiplexer is electrically connected to the first power line and the second power line to receive the high potential panel driving power and the low potential panel driving power.

13. The display device according to claim 1, wherein:
  the display panel comprises:
    a substrate;
    a circuit element layer, on which a plurality of circuit elements for driving the plurality of pixels are disposed; and
    a light emitting element layer disposed on the circuit element layer and including light emitting elements; and
  the light blocking layer is disposed between the substrate and the circuit element layer.

14. The display device according to claim 13, wherein, if the control power is applied to the light blocking layer, an element characteristic of the plurality of circuit elements is configured to be changed by an electric field effect of the light blocking layer.

15. The display device according to claim 1, further comprising:
  a plurality of light sensors configured to sense light incident through the opening portions and to output a corresponding sensing signal; and
  a fingerprint detector configured to detect a fingerprint of a user based on the sensing signal.

16. A method of driving a display panel having a display area including a plurality of pixels and a non-display area surrounding at least one side of the display area, and a light blocking layer at least partially overlapping the display area and including opening portions for selectively passing incident light, the method comprising:
  generating a plurality of powers having different voltage values;
  determining a type of an image to be displayed in the display area during a display period; and
  applying any one of the plurality of powers to the light blocking layer in correspondence with the determined type of the image.

17. The method according to claim 16, wherein applying any one of the plurality of powers to the light blocking layer comprises:
  applying one of the plurality of powers to the light blocking layer as first control power if the image to be displayed in the display area is a still image; and
  applying another one of the plurality of powers to the light blocking layer as second control power having a voltage value less than that of the first control power if the image to be displayed in the display area is a dynamic image.

18. The method according to claim 17, further comprising applying third control power having a voltage value less than the voltage value of the first control power to the light blocking layer during a fingerprint sensing period,
  wherein the third control power has the same voltage value as the second control power or a voltage value different from the voltage value of the second control power.

19. The method according to claim 16, wherein:
  generating the plurality of powers comprises generating high potential panel driving power and low potential panel driving power for driving the pixels; and
  applying any one of the plurality of powers to the light blocking layer comprises applying any one of the high potential panel driving power and the low potential panel driving power to the light blocking layer.

20. The method according to claim 18, further comprising detecting a fingerprint of a user based on light incident through the opening portions during the fingerprint sensing period.

* * * * *